US008386265B2

(12) United States Patent
Subramanian et al.

(10) Patent No.: US 8,386,265 B2
(45) Date of Patent: Feb. 26, 2013

(54) LANGUAGE TRANSLATION WITH EMOTION METADATA

(75) Inventors: Balan Subramanian, Cary, NC (US); Deepa Srinivasan, Cary, NC (US); Mohamad Reza Salahshoor, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/079,694

(22) Filed: Apr. 4, 2011

(65) Prior Publication Data

US 2011/0184721 A1 Jul. 28, 2011

Related U.S. Application Data

(62) Division of application No. 11/367,464, filed on Mar. 3, 2006, now Pat. No. 7,983,910.

(51) Int. Cl.

*G06F 17/28* (2006.01)
*G10L 13/08* (2006.01)
*G10L 15/26* (2006.01)

(52) U.S. Cl. ............................ 704/277; 704/2; 704/269

(58) Field of Classification Search .................. 704/2, 3, 704/4, 7, 251, 258, 260, 269, 277; 715/364, 715/365; 379/88.05, 88.06

See application file for complete search history.

(56) References Cited

U.S. PATENT DOCUMENTS

| | | | | |
|---|---|---|---|---|
| 5,617,855 | A | 4/1997 | Waletzky et al. | |
| 5,860,064 | A | 1/1999 | Henton | |
| 6,332,143 | B1 | 12/2001 | Chase | |
| 6,453,294 | B1 * | 9/2002 | Dutta et al. | 704/270.1 |
| 6,859,778 | B1 * | 2/2005 | Bakis et al. | 704/277 |
| 6,959,080 | B2 | 10/2005 | Dezonno et al. | |
| 7,013,427 | B2 | 3/2006 | Griffith | |
| 7,089,504 | B1 * | 8/2006 | Froloff | 715/839 |
| 7,137,070 | B2 * | 11/2006 | Brown et al. | 715/744 |
| 7,277,859 | B2 | 10/2007 | Watanabe et al. | |
| 7,296,027 | B2 | 11/2007 | Cobb et al. | |
| 7,340,393 | B2 | 3/2008 | Mitsuyoshi | |
| 7,451,084 | B2 * | 11/2008 | Funakura | 704/235 |

(Continued)

FOREIGN PATENT DOCUMENTS

| | | | |
|---|---|---|---|
| EP | 1498872 | A1 | 7/2003 |
| JP | 2005352311 | | 12/2005 |

(Continued)

OTHER PUBLICATIONS

Subramanian, Balan; Parent U.S. Appl. No. 11/367,464; Non Final Office Action dated Jan. 21, 2010.

(Continued)

*Primary Examiner* — Martin Lerner

(74) *Attorney, Agent, or Firm* — Steven L. Nichols; Van Cott, Bagley, Cornwall & McCarthy P.C.

(57) ABSTRACT

A computer program product for communicating across channels with emotion preservation includes a computer usable storage medium having computer useable program code embodied therewith, the computer usable program code including: computer usable program code to receive a first language communication comprising text marked up with emotion metadata; computer usable program code to translate the emotion metadata into second language emotion metadata; computer usable program code to translate the text to second language text; computer usable program code to analyze the second language emotion metadata for second language emotion information; and computer usable program code to combine the second language emotion information in first language communication with the second language text.

20 Claims, 12 Drawing Sheets

U.S. PATENT DOCUMENTS

| | | | | |
|---|---|---|---|---|
| 7,461,001 | B2 * | 12/2008 | Liqin et al. | 704/277 |
| 7,697,668 | B1 * | 4/2010 | Ostermann et al. | 379/100.08 |
| 7,962,345 | B2 * | 6/2011 | Liqin et al. | 704/277 |
| 7,983,910 | B2 * | 7/2011 | Subramanian et al. | 704/250 |
| 8,224,652 | B2 * | 7/2012 | Wang et al. | 704/275 |
| 2001/0049596 | A1 | 12/2001 | Lavine et al. | |
| 2002/0072900 | A1 * | 6/2002 | Keough et al. | 704/220 |
| 2002/0193996 | A1 * | 12/2002 | Squibbs et al. | 704/260 |
| 2003/0154076 | A1 | 8/2003 | Kemp | |
| 2003/0157968 | A1 | 8/2003 | Boman et al. | |
| 2003/0163320 | A1 | 8/2003 | Yamazaki et al. | |
| 2003/0187660 | A1 * | 10/2003 | Gong | 704/277 |
| 2004/0019484 | A1 | 1/2004 | Kobayashi et al. | |
| 2004/0024602 | A1 | 2/2004 | Kariya | |
| 2004/0057562 | A1 | 3/2004 | Myers et al. | |
| 2004/0062364 | A1 | 4/2004 | Dezonno et al. | |
| 2004/0107101 | A1 | 6/2004 | Eide | |
| 2004/0111271 | A1 * | 6/2004 | Tischer | 704/277 |
| 2004/0111272 | A1 * | 6/2004 | Gao et al. | 704/277 |
| 2004/0172257 | A1 * | 9/2004 | Liqin et al. | 704/277 |
| 2004/0267816 | A1 | 12/2004 | Russek | |
| 2005/0021344 | A1 | 1/2005 | Davis et al. | |
| 2005/0065795 | A1 * | 3/2005 | Mutsuno et al. | 704/260 |
| 2006/0129927 | A1 * | 6/2006 | Matsukawa | 715/532 |
| 2006/0271371 | A1 * | 11/2006 | Tsuboi | 704/277 |
| 2007/0033634 | A1 | 2/2007 | Leurs et al. | |
| 2008/0312920 | A1 * | 12/2008 | Liqin et al. | 704/235 |
| 2010/0082345 | A1 * | 4/2010 | Wang et al. | 704/260 |
| 2010/0195812 | A1 | 8/2010 | Florencio et al. | |
| 2011/0307241 | A1 * | 12/2011 | Waibel et al. | 704/2 |
| 2012/0078607 | A1 * | 3/2012 | Sumita | 704/2 |

FOREIGN PATENT DOCUMENTS

| | | |
|---|---|---|
| KR | 20030046444 | 6/2003 |

OTHER PUBLICATIONS

Subramanian, Balan; Parent U.S. Appl. No. 11/367,464; Final Office Action dated May 10, 2010.

Associated Press; Google unveils video viewing software, But TV content not included; The Associate Press, Jun. 27, 2005; http://www.msnbc.com/id/8379876.

* cited by examiner

FIG. 4

| USER PROFILES (SPEAKER-LISTENER) | |
|---|---|
| USER1 | LANGUAGE-A |
| -Language1 | --Dialect-A1 |
| --Dialect1 | ---Region-A11 |
| ---Region1 | ---Region-A12 |
| -SP1Personality | ---Region-A13 |
| | --Dialect-A21 |
| USER2 | ---Region-A21 |
| -Language2 | ---Region-A22 |
| --Dialect2 | ---Region-A23 |
| ---Region2 | |
| -SP2Personality | LANGUAGE-B |
| | --Dialect-B1 |
| USER3 | ---Region-B11 |
| -Language3 | ---Region-B12 |
| --Dialect3 | --Dialect-B21 |
| ---Region3 | ---Region-B21 |
| -SP3Personality | ---Region-B22 |

| AUDIENCE PROFILES | |
|---|---|
| Acquaintances | BUSINESS |
| -Casual | -Supervisor |
| -Friends | -Subordinate |
| | -Coworker |
| FAMILY | |
| -Mother | FORMAL |
| -Father- | -Speech |
| -Spouse | -Presentation |
| --Wife | -Interview |
| --Husband | |
| -Progeny | CASUAL |
| --Daughter | -Telephone |
| --Son | -Social |
| -Sibling | |
| | GENERAL/ DEFAULT |

LANGUAGE TRANSLATION WITH EMOTION METADATA

RELATED APPLICATIONS

The present application is a divisional application of, and claims priority under 35 U.S.C. §120 from, U.S. patent application Ser. No. 11/367,464, filed Mar. 3, 2006, now U.S. Pat. No. 7,983,910, issued 19 Jul. 2011, entitled "COMMUNICATING ACROSS VOICE AND TEXT CHANNELS WITH EMOTION PRESERVATION," which patent is hereby incorporated by reference in its entirety.

BACKGROUND OF THE INVENTION

The present invention relates to preserving emotion across voice and text communication transformations.

Human voice communication can be characterized by two components: content and delivery. Therefore, understanding and replicating human speech involves analyzing and replicating the content of the speech as well as the delivery of the content. Natural speech recognition systems enable an appliance to recognize whole sentences and interpret them. Much of the research has been devoted to deciphering text from continuous human speech, thereby enabling the speaker to speak more naturally (referred to as Automatic Speech Recognition (ASR)). Large vocabulary ASR systems operate on the principle that every spoken word can be atomized into an acoustic representation of linguistic phonemes. Phonemes are the smallest phonetic unit in a language that is capable of conveying a distinction in meaning. The English language contains approximately forty separate and distinct phonemes that make up the entire spoken language, e.g., consonants, vowels, and other sounds. Initially, the speech is filtered for stray sounds, tones and pitches that are not consistent with phonemes and is then translated into a gender-neutral, monotonic audio stream. Word recognition involves extracting phonemes from sound waves of the filtered speech and then creating weighted chains of phonemes that represent the probability of word instances and finally, evaluating the probability of the correct interpretation of a word from its chain. In large vocabulary speech recognition, a hidden Markov model (HMM) is trained for each phoneme in the vocabulary (sometimes referred to as an HMM phoneme). During recognition, the likelihood of each HMM in a chain is calculated, and the observed chain is classified according to the highest likelihood. In smaller vocabulary speech recognition, an HMM may be trained for each word in the vocabulary.

Human speech communication conveys information other than lexicon to the audience, such as the emotional state of a speaker. Emotion can be inferred from voice by deducing acoustic and prosodic information contained in the delivery of the human speech. Techniques for deducing emotions from voice utilize complex speaker dependent models of emotional state, that are reminiscent of those created for voice recognition. Recently, emotion recognition systems have been proposed that operate on the principle that emotions (or the emotional state of the speaker) can be distilled into an acoustic representation of sub-emotion units that make up delivery of the speech (i.e., specific pitches, tones, cadences and amplitudes, or combinations thereof, of the speech delivery). The aim to identify the emotional content of speech with these predefined sub-emotion speech patterns that can be combined into emotion unit models that represent the emotional state of the speaker. However, unlike text recognition which filter the speech into a gender-neutral and monotonic audio stream, the tone, timbre and, to some extent, the gender of the speech is unaltered for more accurately recognizing emotion units. A hidden Markov model may be trained for each sub-emotion unit and during recognition, the likelihood of each HMM in a chain is calculated, and the observed chain is classified according to the highest likelihood for an emotion.

BRIEF SUMMARY OF THE INVENTION

The present invention relates generally to communicating across channels while preserving the emotional content of a communication. A voice communication is received and analyzed for emotion content. Voice patterns are extracted from the communication and compared to voice pattern-to-emotion definitions. The textual content of the communication is realized summarily using word recognition techniques, by analyzing the voice communication by extracting voice patterns from the voice communication and comparing those voice patterns to voice pattern-to-text definitions. The textual content derived from the word recognition can then be analyzed for emotion content. Words and phrases derived from the word recognition are compared to emotion words and phrases in a text mine database. The emotion from the two analyses is then used for marking up the textual content as emotion metadata.

A text and emotion markup abstraction for a voice communication in a source language is translated into a target language and then voice synthesized and adjusted for emotion. The emotion metadata is translated into emotion metadata for a target language using emotion translation definitions for the target language. The text is translated into a text for the target language using text translation definitions. Additionally, the translated emotion metadata is used to emotion mine words that have an emotion connotation in the culture of the target language. The emotion words are than substituted for corresponding words in the target language text. The translated text and emotion words are modulated into a synthesized voice. The delivery of the synthesized voice can be adjusted for emotion using the translated emotion metadata. Modifications to the synthesized voice patterns are derived by emotion mining an emotion-to-voice pattern dictionary for emotion voice patterns, which are used to modify the delivery of the modulated voice.

Text and emotion markup abstractions can be archived as artifacts of their original voice communication in a content management system. These artifacts can then be searched using emotion conditions for the context of the original communication, rather than through traditional text searches. A query is received at the content management system for communication artifact that includes an emotion value and a context value. The records for all artifacts are sorted for the context and the matching records are then sorted for the emotion. Result artifacts that contain matching emotion metadata, within the context constraint, are passed to the requestor for review. The requestor identifies one or more particular artifacts, which are then retrieved by the content manager and forwarded to the requestor. There, the requestor can translate the text and emotion metadata to a different language and synthesize an audio message while preserving the emotion content of the original communication, as discussed immediately above.

BRIEF DESCRIPTION OF THE SEVERAL VIEWS OF THE DRAWINGS

The novel features believed characteristic of the present invention are set forth in the appended claims. The invention, will be best understood by reference to the following description of an illustrative embodiment when read in conjunction with the accompanying drawings wherein:

FIG. 4 is a diagram showing exemplary context profiles including profile information specifying the speaker's language, dialect, geographic region and personality attributes;

Figure 1A:
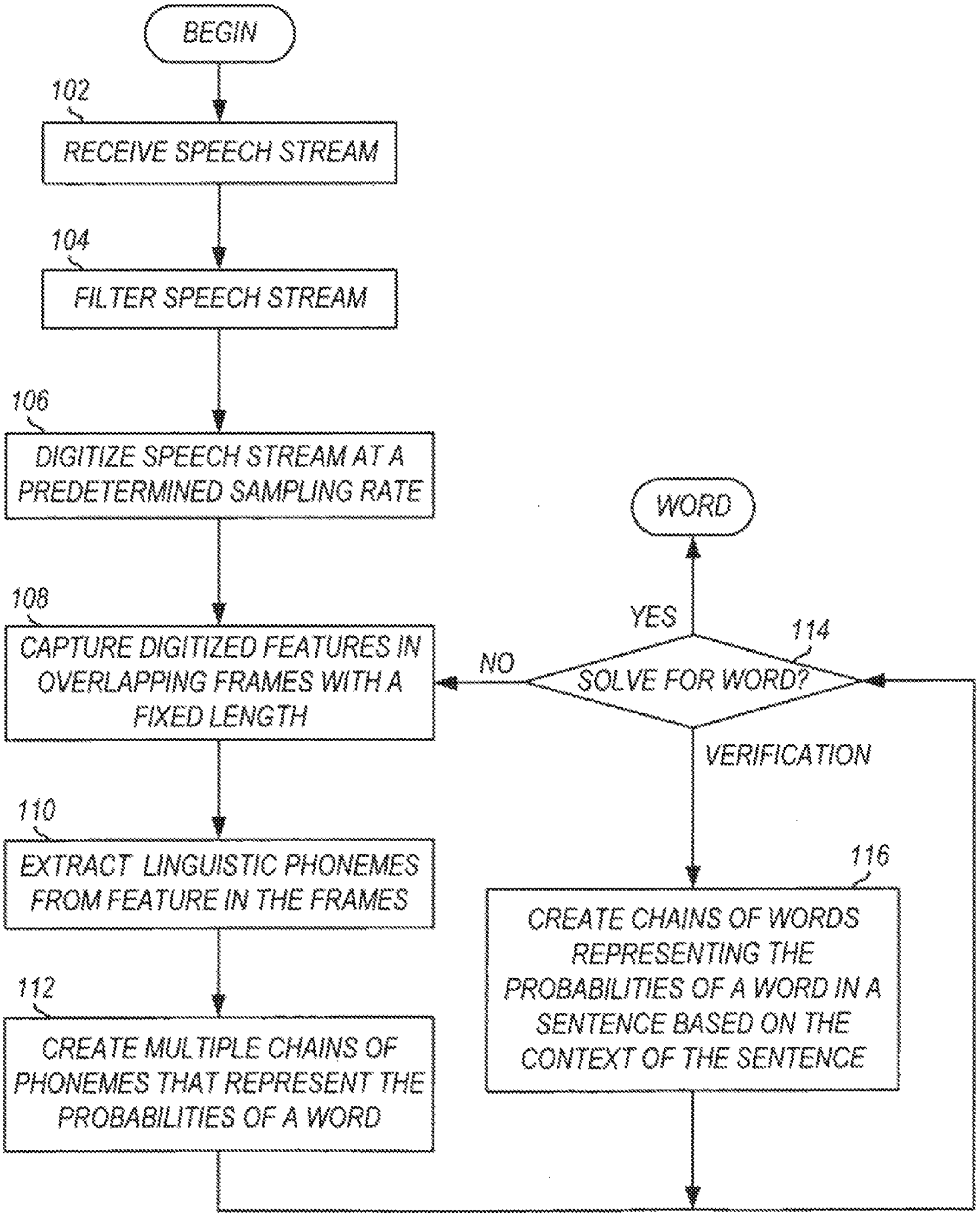
FIG. 1A PRIOR ART
FIG. 1A is a flowchart depicting a generic process for recognizing the word content of human speech as understood by the prior art.

Other features of the present invention will be apparent from the accompanying drawings and from the following detailed description.

DETAILED DESCRIPTION OF THE INVENTION

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Hash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Moreover, the computer readable medium may include a carrier wave or a carrier signal as may be transmitted by a computer server including internets, extranets, intranets, world wide web, ftp location or other service that may broadcast, unicast or otherwise communicate an embodiment of the present invention. The various embodiments of the present invention may be stored together or distributed, either spatially or temporally across one or more devices.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Basic human emotions can be categorized as surprise, peace (pleasure), acceptance (contentment), courage, pride, disgust, anger, lust (greed) and fear (although other emotion categories are identifiable). These basic emotions can be recognized by the emotional content of human speech by analyzing speech patterns in the speaker's voice, including the pitch, tone, cadence and amplitude characteristics of the speech. Generic speech patterns can be identified in a communication that corresponds to specific human emotions for a particular language, dialect and/or geographic region of the spoken communication. Emotion speech patterns are often as unique as the individual herself. Individuals tend to refine their speech patterns for their audiences and borrow emotional speech patterns that accurately convey their emotional state. Therefore, if the identity of the speaker is known, the audience can use the speakers personal emotion voice patterns to more accurately analyze her emotional state.

Emotion voice analysis can differentiate speech patterns that indicate pleasantness, relaxation or calm from those that tend to show unpleasantness, tension, or excitement. For instance, pleasantness, relaxation or calm voice patterns are recognized in a particular speaker as having low to medium/average pitch; clear, normal and continuous tone; a regular or periodic cadence; and low to medium amplitudes. Conversely, unpleasantness, tension and excitement are recognizable in a particular speaker's voice patterns by low to high pitch (or changeable pitch), low, high or changing tones, fast, slow or varying cadence and very low to very high amplitudes. However, extracting a particular speech emotion from all other possible speech emotions is a much more difficult task than merely differentiating excited speech from tranquil speech patterns. For example, peace, acceptance and pride may all have similar voice patterns and deciphering between the three might not be possible using only voice pattern analysis. Moreover, deciphering the degree of certain human emotions is critical to understanding the emotional state of the speaker. Is the speaker highly disgusted or on the verge of anger? Is the speaker exceedingly prideful or moderately surprised? Is the speaker conveying contentment or lust to the listener?

Prior art techniques for extracting the textual and emotional information from human speech rely on voice analysis for recognizing speech patterns in the voice for making the text and emotion determinations. Generally, two separate sets of voice pattern models are created beforehand for analyzing the voice of a particular speaker for its textual and emotion content. The first set of models represent speech patterns of a speaker for specific words and the second model set represents speech patterns for the emotional state for the speaker.

With regard to the first model, an inventory of elementary probabilistic models of basic linguistic units, discussed elsewhere above, is used to build word representations. A model for every word in the English language can be constructed by chaining together models for the 45 phoneme models and two additional phoneme models, one for silence and another for the residual noise that remains after filtering. Statistical models for sequences of feature observations are matched against the word models for recognition.

Emotion can be inferred from voice by deducing acoustic and prosodic information contained in the delivery of the human speech. Emotion recognition systems operate on the principle that emotions (or the emotional state of the speaker) can be distilled into an acoustic representation of the sub-emotion units that make up speech (i.e., specific pitches, tones, cadences and amplitudes, or combinations thereof, of the speech delivery). The emotional content of speech is determined by creating chains of sub-emotion speech pattern observations that represent the probabilities of emotional states of the speaker. An emotion unit model may be trained for each emotion unit and during recognition, the likelihood of each sub-emotion speech pattern in a chain is calculated, and the observed chain is classified according to the highest likelihood for an emotion.

Figure 1B:
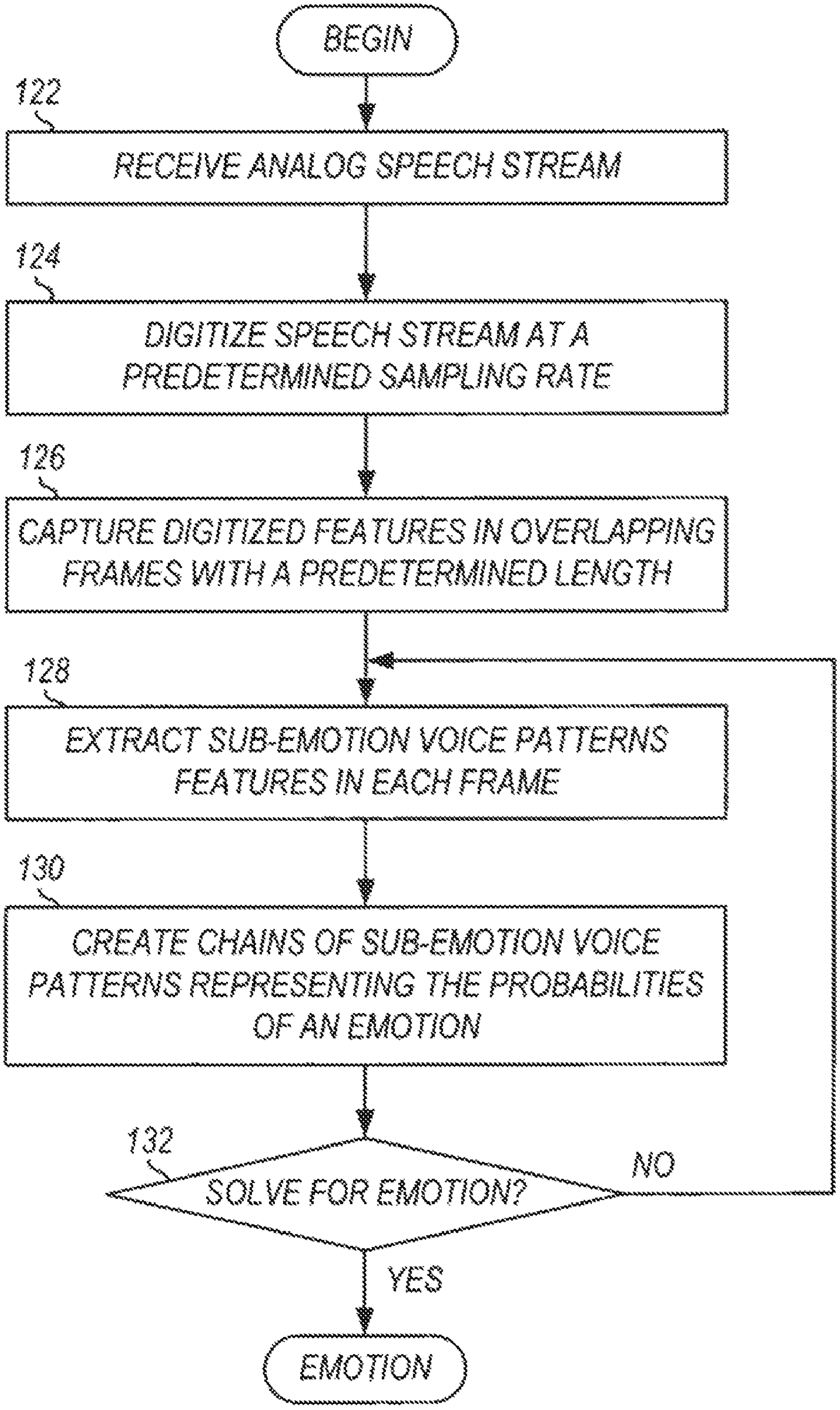
FIG. 1B PRIOR ART
FIG. 1B is a flowchart depicting a generic process for recognizing the emotion content of human speech as understood by the prior art.

FIG. 1A is a flowchart depicting a generic process for recognizing the word content of human speech as understood by the prior art. FIG. 1B is a flowchart depicting a generic process for recognizing the emotion content of human speech as understood by the prior art. The generic word recognition process for recognizing words in speech begins by receiving an audio communication channel with a stream of human speech (step 102). Because the communication stream may contain spurious noise and voice patterns that could not contain linguistic phonemes, the communication stream is filtered for stray sounds, tones and pitches that are not consistent with linguistic phonemes (step 104). Filtering the communication stream eliminates noise from the analysis that has a low probability of reaching a phoneme solution, thereby increasing the performance. The monotonic analog stream is then digitized by sampling the speech at a predetermined sampling rate, for example 10,000 samples per second (step 106). Features within the digital stream are captured in overlapping frames with fixed frame lengths (approximately 20-30 msec.) in order to ensure that the beginning and ending of every feature that correlates to a phoneme is included in a frame (step 108). Then, the frames are analyzed for linguistic phonemes, which are extracted (step 110) and the phonemes are concatenated into multiple chains that represent probabilities of textual words (step 112). The phoneme chains are checked for a word solution (or the best word solution) against phoneme models of words in the speaker's language (step 114) and the solution word is determined from the chain having the highest score. Phoneme models for a word may be weighted based on the usage frequency of the word for the speaker (or by some other metric such as the usage frequency of the word for a particular language). The phoneme weighting process may be accomplished by training for word usage or manually entered. The process may then end.

Alternatively, chains of recognized words may be formed that represent the probabilities of a potential solution word in the context of a sentence created from a string of solution words (step 114). The most probable solution words in the context of the sentence are returned as text (step 116) and the process ends.

The generic process for extracting emotion from human speech, as depicted in FIG. 1B, begins by receiving the communication stream of human speech (step 122). Unlike word recognition, the emotional content of speech is evaluated from human voice patterns comprised of wide ranging pitches, tones and amplitudes. For this reason, the analog speech is digitized with little or no filtering and it is not translated to monotonic audio (step 124). The sampling rate is somewhat higher than for word recognition, between 12,000 and 15,000 samples per second. The features within the digital stream are captured in overlapping frames with a fixed duration (step 126). Sub-emotion voice patterns are identified in the frames and extracted (step 128). The sub-emotion voice patterns are combined together to form multiple chains that represent probabilities of an emotion unit (step 130). The chains are checked for an emotion solution (or the best emotion fit) against emotion unit models for the respective emotions (step 132) and the solution word output. The process may then end.

Figure 2:
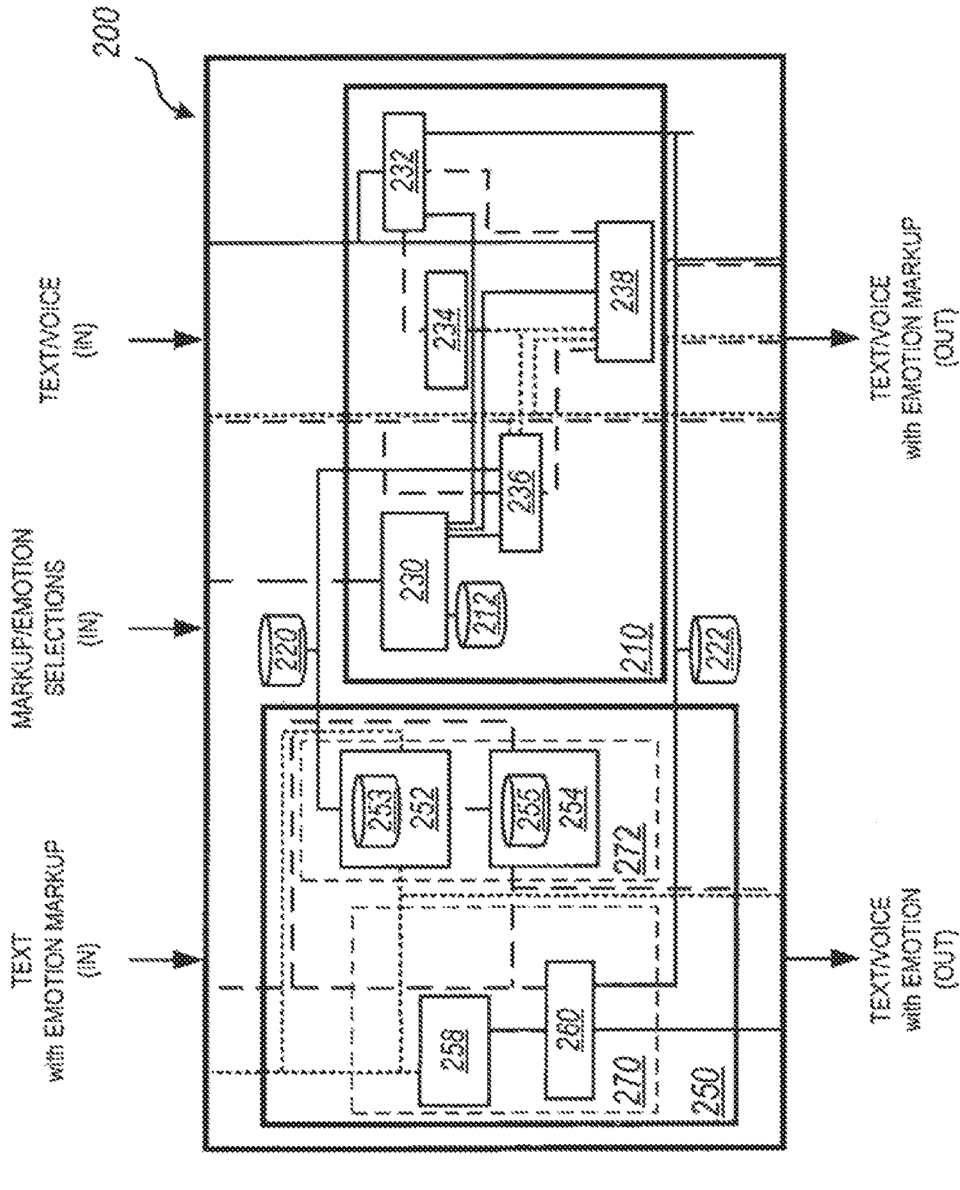
FIG. 2 is a diagram showing the logical components of an emotion communication architecture for generating and processing a communication stream while preserving the emotion content of the communication in accordance with an exemplary embodiment of the present invention.

The present invention is directed to communicating across voice and text channels while preserving emotion. FIG. 2 is a diagram of an exemplary embodiment of the logical components of an emotion communication architecture for generating and processing a communication stream while preserving the emotion content of the communication. Emotion communication architecture 200 generally comprises two subcomponents: emotion translation component 250 and emotion markup component 210. The bifurcated components of emotion communication architecture 200 are each connected to a pair of emotion dictionaries containing bi-directional emotion definitions: emotion-text/phrase dictionary 220 and emotion-voice pattern dictionary 222. The dictionaries are populated with definitions based on the context of the communication. Emotion markup component 210 receives a communication that includes emotion content (such as speech with speech emotion) and recognizes the words in the speech and transcribes the recognized words to text. Emotion markup component 210 also analyzes the communication for emotion, in addition to words. Emotion markup component 210 deduces emotion from the communication using the dictionaries. The resultant text is then marked up with emotion meta information. The textual output with emotion markup takes up far less space then voice and is much easier to search, and preserves the emotion of the original communication.

Selection commands may also be received at emotion markup component 210, issued by a user, for specifying particular words, phrases, sentences and passages in the communication for emotion analysis. These commands may also designate which type of analysis, text pattern analysis (text mining), or voice analysis, to use for extracting emotion from the selected portion of the communication.

Emotion translation component 250 receives a communication, typically text with emotion markup metadata, and parses the emotion content. Emotion translation component 250 synthesizes the text into a natural language and adjusts the tone, cadence and amplitude of the voice delivery for emotion based the emotion metadata accompanying the text. Alternatively, prior to modulating the communication stream, emotion translation component 250 may translate the text and emotion metadata into the language of the listener.

Although emotion communication architecture 200 is depicted in the figure as comprising both subcomponents, emotion translation component 250 and emotion markup component 210, these components may be deployed separately on different appliances. For example, voice communication transmitted from a cell phone is notorious for its poor compatibility to speech recognition systems. Deploying emotion markup component 210 on a cell would improve voice recognition efficiency because speech recognition is performed at the cell phone, rather than on voice received from the cell. With regard to processing emotion translation component 250, home entertainment systems typically utilize text captioning for the hearing impaired, but without emotion cues. Deploying emotion translation component 250 in a home entertainment system would facilitate the captioning to include emotion clues for caption text, such as emoticons, symbols and punctuation characters representing emotion. Furthermore, emotion translation component 250 would also enable an unimpaired viewer to translate the audio into any language supported by the translation dictionary in emotion translation component 250, while preserving the emotion from the original communication language.

Emotion communication architecture 200 can be incorporated in virtually any device which sends, receives or transmits human communication (e.g., wireless and wired telephones, computers, handhelds, recording and voice capture devices, audio entertainment components (television, surround sound and radio), etc.). Furthermore, the bifurcated structure of emotion communication architecture 200, utilizing a common emotion-phrase dictionary and emotion-voice pattern dictionary, enables emotions to be efficiently extracted and conveyed across a wide variety of media while preserving the emotional content (e.g., human voice, synthetic voice, text and text with emotion inferences.

Figure 3:
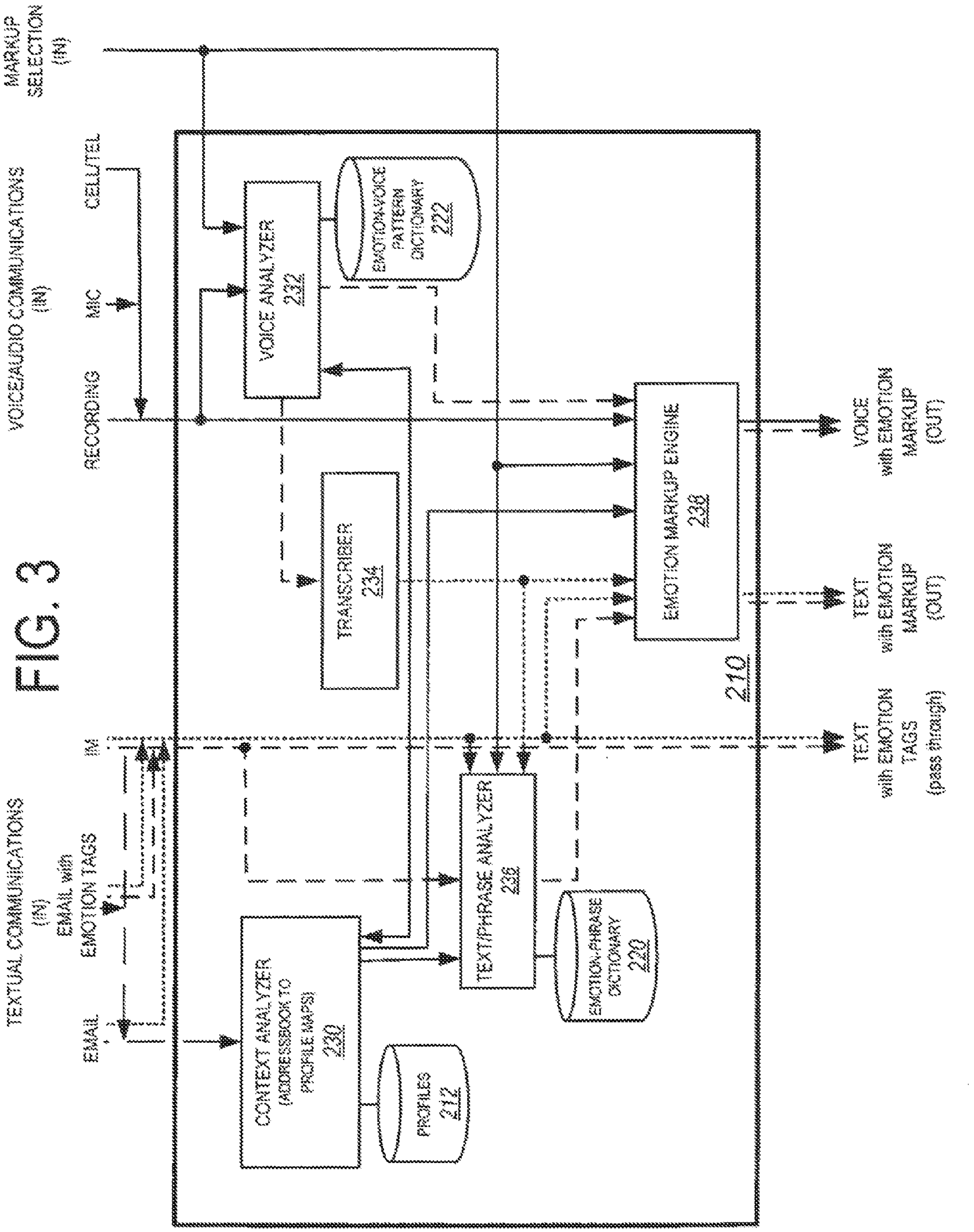
FIG. 3 is a diagram of the logical structure of an emotion markup component in accordance with an exemplary embodiment of the present invention.

Turning to FIG. 3, the structure of emotion markup component 210 is shown in accordance with an exemplary embodiment of the present invention. The purpose of emotion markup component 210 is to efficiently and accurately convert human communication into text and emotional metadata, regardless of the media type, while preserving the emotion content of the original communication. In accordance with an exemplary embodiment of the present invention, emotion markup component 210 performs two types of emotion analysis on the audio communication stream, a voice pattern analysis for deciphering the emotion content from speech patterns in the communication (the pitch, tone, cadence and amplitude characteristics of the speech) and a text pattern analysis (text mining) for deriving the emotion content from the text patterns in the speech communication.

The textual data with emotion markup produced by emotion markup component 210 can be archived in a database for future searching or training, or transmitted to other devices that include emotion translation component 250 for reproducing the speech that preserves the emotion of the original communication. Optionally, emotion markup component 210 also intersperses other types of metadata with the outputted text including selection control metadata, that is, used by emotion translation component 250 to introduce appropriate frequency and pitch when that portion is delivered as speech, and word meaning data.

Emotion markup component 210 receives three separate types of data that are useful for generating a text with emotion metadata: communication context information, the communication itself, and emotion tags or emoticons that may accompany certain media types. The context information is used to select the most appropriate context profiles for the communication, which are used to populate the emotion dictionaries for the particular communication. Using the emotion dictionaries, emotion is extracted from the speech communication. Emotion may also be inferred from emoticons that accompany the textual communication.

In accordance with one embodiment of the present invention, emotion is deduced from a communication by text pattern analysis and voice analysis. Emotion-voice pattern dictionary 222 contains emotion to voice pattern definitions for deducing emotion from voice patterns in a communication, while emotion-text/phrase dictionary 220 contains emotion to text pattern definitions for deducing emotion from text patterns in a communication. The dictionary definitions can be generic and abstracted across speakers, or specific to a particular speaker, audience and circumstance of a communication. While these definitions may be as complex as phrases, they may also be as incomplete as punctuation. Because emotion-text/phrase dictionary 220 will be employed to text mine both the transcribed text from a voice communication and the textual communication directly from a textual communication, emotion-text/phrase dictionary 220 contains emotion definitions for words, phrases, punctuation and other lexicon and syntax that may infer emotional content.

A generic, or default, will provide acceptable mainstream results for deducing emotion in a communication. The dictionary definitions can be optimized for a particular speaker, audience and circumstance of a communication and achieve highly accurate emotion recognition results in the context of the optimization, but the mainstream results suffer dramatically. The generic dictionaries can be optimized by training, either manually or automatically, to provide higher weights to the most frequently used text patterns (words and phrases) and voice patterns, and to provide learned emotional content to text and voice patterns.

A speaker alters his text patterns and voice patterns for conveying emotion in a communication with respect to the audience and the circumstance of the communication (i.e., the occasion or type of communication between the speaker and audience). Typically, the same person will choose different words (and text patterns) and voice patterns to convey the identical emotion to different audiences, and/or under difference circumstances. For instance, a father will choose particular words that convey his displeasure with a son who has committed some offense and after his normal voice patterns of his delivery to reinforce his anger over the incident. However, for similar incident in the workplace, the same speaker would usually choose different words (and text patterns) and alter his voice patterns differently, from that used the familial circumstance, to convey his anger over an identical incident in the workplace.

Since the text and voice patterns used to convey emotion in a communication depends on the context of the communication, the context of a communication provides a mechanism for correlating the most accurate emotion definitions in the dictionaries for deriving the emotion from text and voice patterns contained in a communication. The context of a communication involves the speaker, the audience and the circumstance of the communication, therefore, the context profile is defined by, and specific to, the identities of the speaker and audience and the circumstance of the communication. The context profiles for a user define the differences between a generic dictionary and one trained, or optimized, for the user in a particular context. Essentially, the context profiles provide a means for increasing the accuracy a dictionary based on context parameters.

A speaker profile specifies, for example, the speaker's language, dialect and geographic region, and also personality attributes that define the uniqueness of the speaker's communication (depicted in FIG. 4). By applying the speaker profile, the dictionaries would be optimized for the context of the speaker. An audience profile specifies the class of listener(s), or who the communication is directed toward, e.g., acquaintance, family, business, etc. The audience profile may even include subclass information for the audience, for instance, if the listener is an acquaintance, whether the listener is a casual acquaintance or a friend. The personality attributes for a speaker are learned emotional content of words and phrases that are personal to the speaker. These attributes are also used for modifying the dictionary definitions for words and speech patterns that the speaker uses to convey emotion to an audience, but often the personality attributes are learned emotional content of words and phrases that may be inconsistent or even contradictory to their generally accepted emotion content.

Profile information should be determined for any communication received at emotion markup component 210 for selecting and modifying the dictionary entries for the particular speaker/user and the context of the communication, i.e., the audience and circumstance of the communication. The context information for the communication is manually entered into emotion markup component 210 at context analyzer 230. Alternatively, the context of the communication may be derived automatically from the circumstance of the communication, or the communication media by context analyzer 230. Context analyzer 230 analyzes information that is directly related to the communication for the identities of the speaker and audience, and the circumstance, which is used to select an existing profile from profile database 212. For example, if emotion markup component 210 is incorporated in a cell phone, context analyzer 230 assumes the identity of speaker/user as the owner of the phone and identifies the audience (or listener) from information contained in the address book stored in the phone and the connection information (e.g., phone number, instance message screen name or email address). Then again, context profiles can be selected from profile database 212 based on information received from voice analyzer 232.

If direct context information is not readily available for the communication, context analyzer 230 initially selects a generic or default profile and then attempts to update the profile using information learned about the speaker and audience during the analysis communication. The identity of the speaker may be determined from voice patterns in the communication. In that case, voice analyzer 232 attempts to identify the speaker by comparing voice patterns in the conversation with voice patterns from identified speakers. If voice analyzer 232 recognizes a speaker's voice from the voice patterns, context analyzer 230 is notified which then selects a context profile for the speaker from profile database 212 and forwards it to voice analyzer 232 and text/phrase analyzer 236. Here again, although the analyzers have the speaker's profile, this profile that does not provide complete context information is incomplete because the audience and circumstance information is not known for the communication. A better profile could be identified for the speaker with the audience and circumstance information. If the speaker cannot be identified, the analysis proceeds using the default context profile. One advantage of the present invention is that all communications can be archived at content management system 600 in their raw form and with emotion markup metadata (described below with regard to FIG. 6). Therefore, the speaker's communication is available for a second emotion analysis pass when a complete context profile is known for the speaker. Subsequent emotion analysis passes can also be made after training, if training significantly changes the speaker's context profile.

Once the context of the communication is established, the profiles determined for the context of the communication and the voice-pattern and text/phrase dictionary selected, the substantive communication received at emotion markup component 210 can be converted to text and combined with emotion metadata that represents the emotional state of the speaker. The communication media received by emotion markup component 210 is either voice or text, however textual communication may also include emoticons indicative of emotion (emoticons generally refer to visual symbolisms that are combined with text and represent emotion, such as a smiley face or frowning face), punctuation indicative of emotion, such as an exclamation mark, or emotion symbolism created from typographical punctuation characters, such as ":-)" ":-(," and ";-)".

Speech communication is fed to voice analyzer 232, which performs two primary functions; it recognizes words, and it recognizes emotions from the audio communication. Word recognition is performed using any known word recognition system such as by matching concatenated chains of linguistic phonemes extracted from the audio stream to pre-constructed phoneme word models (the results of which are sent to transcriber 234). Emotion recognition may operate similarly by matching concatenated chains of sub-emotion speech patterns extracted from the audio stream to pre-constructed emotion unit models (the results of which are sent directly to markup engine 238). Alternatively, a less computational intensive emotion extraction algorithm may be implemented that matches voice patterns in the audio stream to voice patterns for an emotion (rather than chaining sub-emotion voice pattern units). The voice patterns include specific pitches, tones, cadences and amplitudes, or combinations thereof, contained in the speech delivery.

Word recognition proceeds within voice analyzer 232 using any well known speech recognition algorithm, including hidden Markov modeling (HMM), such as that described above with regard to FIG. 1A. Typically, the analog audio communication signal is filtered for extraneous noises that cannot result in a phoneme solution and the filtered signal is digitized at a predetermined sampling rate (approximately 8000-10,000 samples per second for western European languages and their derivatives). Next, an acoustic model topology is employed for extracting features within overlapping frames (with fixed frame lengths) of the digitized signals that correlate to known patterns for a set of linguistic phonemes (35-55 unique phonemes have been identified for European languages and their derivatives, but for more complicated spoken languages, up to several thousand unique phonemes may exist). The extracted phonemes are then concatenated into chains based on the probability that the phoneme chain may correlate to a phoneme word model. Since a word may be spoken differently from its dictionary lexicon, the phoneme word model with the highest probability score of a match represents the word. The reliability of the score may be increased between lexicon and pronounced speech by including HMM models for all common pronunciation variations, including some voice analysis at the sub-phoneme level and/or modifying the acoustic model topology to reflect variations in the pronunciation.

Words with high probability matches may be verified in the context of the surrounding words in the communication. In the same manner as various strings of linguistic phonemes form probable fits to a phoneme model of a particular word, strings of observed words can also be concatenated together into a sentence model based on the probabilities of word fits in the context of the particular sentence model. If the word definition makes sense in the context of the surrounding words, the match is verified. If not, the word with the next highest score is checked. Verifying word matches is particularly useful with the present invention because of the reliance on text mining in emotion-phrase dictionary 220 for recognizing emotion in a communication and because the transcribed text may be translated from the source language.

Most words have only one pronunciation and a single spelling that correlate to one primary definition accepted for the word. Therefore, most recognized words can be verified by checking the probability score of a word (and word meaning) fit in the context of a sentence constructed from other recognized words in the communication. If two observed phoneme models have similar probability scores, they can be further analyzed by their meanings in the context of the sentence model. The word with the highest probability score in the context of the sentence is selected as the most probable word.

On the contrary, some words have more than one meaning and/or more than one spelling. For instance, homonyms are words that are pronounced the same (i.e., have identical phoneme models), but have different spellings and each spelling may have one or more separate meanings (e.g., for, fore and four, or to, too and two). These ambiguities are particularly problematic when transcribing the recognized homonyms into textual characters and for extracting any emotional content that homonym words may impart from their meanings. Using a contextual analysis of the word meaning in the sentence model, one homonym meaning of a recognized word will score higher than all other homonym meanings for the sentence model because only one of the homonym meanings makes sense in the context of the sentence. The word spelling is taken from the homonym word with the most probable meaning, i.e., the one with the best score. Heteronyms are words that are pronounced the same, spelled identically and have two or more different meanings. A homonym may also be a heteronym if one spelling has more than one meaning. Heteronym words pose no particular problem with the transcription because no spelling ambiguity exists. However, heteronym words do create definitional ambiguities that should be resolved before attempting text mining to extract the emotional content from the heteronym or translating a heteronym word into another language. Here again, the most probable meaning for a heteronym word can be determined from the probability score of a heteronym word meaning in the sentence model. Once the most probable definition is determined, definitional information can be passed to the transcriber 234 as meta information, for use in emotion extraction, and to emotion markup engine 238, for inclusion as meaning metadata, with the emotion markup metadata, that may be helpful in translating heteronym words into other languages.

Transcriber 234 receives the word solution from voice analyzer 232 and any accompanying meaning metadata and transcribes them to a textual solution. Homonym spelling is resolved using the metadata from voice analyzer 232, if available. The solution text is then sent to emotion markup engine 238 and text/phrase analyzer 236 as it is transcribed.

The emotion recognition process within voice analyzer 232 may operate on a principle that is somewhat suggestive of word recognition, using, for example, HMM, and as described above with regard to FIG. 1B. However, creating sub-emotion unit models from chains of sub-emotion voice patterns is not as forthright as creating word phonemes models for probability comparisons. Some researchers have identified more than 100 sub-emotion voice patterns (emotion units) for English spoken in the United States. The composition and structure of the sub-emotion voice patterns vary widely between cultures, even between those cultures that use a common language, e.g. Canada and the United Kingdom. Also, emotion models constructed from chains of sub-emotion voice patterns are somewhat ambiguous, especially when compared to their phoneme word model counterparts. Therefore, an observed sub-emotion model may result in a relatively low probability score to the most appropriate emotion unit model, or worse, it may result in a score that is statistically indistinguishable from the scores for incorrect emotion unit models.

In accordance with an exemplary embodiment, emotion recognition process proceeds within voice analyzer 232 with minimal or no filtering of an analog audio signal because of the relatively large number of sub-emotion voice patterns to be detected from the audio stream (over 100 sub-emotion voice patterns have been identified). An analog signal is digitized at a predetermined sampling rate that is usually higher than that for word recognition, usually over 12,000 and up to 15,000 samples per second. Feature extraction proceeds within overlapping frames of the digitized signals having fit frame lengths to accommodate different starting and stopping points of the digital features that correlate to sub-emotion voice patterns. The extracted sub-emotion voice patterns are combined into chains of sub-emotion voice pattern based on the probability that the observed sub-emotion voice pattern chain correlates to an emotion unit model for a particular emotion and is resolved for the emotion based on a probability score of a correct match.

Alternatively, voice analyzer 232 may employ a less robust emotion extraction process that requires less computational capacity. This can be accomplished by reducing the quantity of discrete emotions to be resolved through emotion analysis. By combining discrete emotions with similar sub-emotion voice pattern models, a voice pattern template can be constructed for each emotion and used to match voice patterns observed in the audio. This is synonymous in word recognition to template matching for small vocabularies.

Voice analyzer 232 also performs a set of ancillary functions, including speaker voice analysis, audience and context assessments and word meaning analysis. In certain cases, the speaker's identity may not be known, and voice analysis proceeds using a default context profile. In one instance, context analyzer 230 will pass speaker voice pattern information for each speaker profile contained in profile database 212. Then, voice analyzer 232 simultaneously analyzes the voice for word recognition, emotion recognition and speaker voice pattern recognition. If the speech in the communication matches a voice pattern, voice analyzer 232 notifies context analyzer 230, which then sends a more complete context profile for the speaker.

In practice, voice analyzer 232 may be implemented as two separate analyzers, one for analyzing the communication stream for linguistic phonemes and the other for analyzing the communication stream for sub-emotion voice patterns (not shown).

Text communication is received at text/phrase analyzer 236 from voice analyzer 232, or directly from a textual communication stream. Text/phrase analyzer 236 deduces emotions from text patterns contained in the communication stream by text mining emotion-text/phrase dictionary 220. When a matching word or phrase is found in emotion-text/phrase dictionary 220, the emotion definition for the word provides an inference to the speaker's emotional state. This emotion analysis relies on explicit text pattern to emotion definitions in the dictionary. Only words and phrases that are defined in the emotion-phrase dictionary can result in an emotion inference for the communication. Text/phrase analyzer 236 deduces emotions independently or in combination with voice analysis by voice analyzer 232. Dictionary words and phrases that are frequently used by the speaker are assigned higher weights than other dictionary entries, indicating a higher probability that the speaker intends to convey the particular emotion through the vocabulary choice.

The text mining solution improves accuracy and speed by using text mining databases particular for languages and over voice analysis alone. In cases where text mining emotion-text/phrase dictionary 220 is used for analysis of speech from a particular person, the dictionary can be further trained either manually or automatically to provide higher weights to the user's most frequently used phrases and learned emotional content of those phrases. That information can be saved in the user's profile.

As discussed above, emotion markup component 210 derives the emotion from a voice communication stream using two separate emotion analyses, voice pattern analysis (voice analyzer 232) and text pattern analysis (text/phrase analyzer 236). The text or speech communication can be selectively designated for emotion analysis and the type of emotion analysis to be performed can likewise be designated. Voice and text/phrase analyzers 232 and 236 receive a markup command for selectively invoking the emotion analyzers, along with emotion markup engine 238. The markup command corresponds to a markup selection for designating a segment of the communication for emotion analysis and subsequent emotion markup. In accordance with one exemplary embodiment, segments of the voice and/or audio communication are selectively marked for emotion analysis while the remainder is not analyzed for its emotion content. The decision to emotion analyze the communication may be initiated manually by a speaker, audience member or another user. For example, a user may select only portions of the communication for emotion analysis. Alternatively, selections in the communication are automatically marked up for emotion analysis without human intervention. For instance, the communication stream is marked for emotion analysis at the beginning of the communication and for a predetermined time thereafter for recognizing the emotional state of the speaker. Subsequent to the initial analysis, the communication is marked for further emotion analysis based on a temporal algorithm designed to optimize efficiency and accuracy.

The markup selection command may be issued in real time by the speaker or audience, or the selection may be made on recorded speech any time thereafter. For example, an audience member may convert an oral communication to text on the fly, for inclusion in an email, instant message or other textual communication. However, marking the text with emotion would result in an unacceptably long delay. One solution is to highlight only certain segments of the oral communication that typify the overall tone and timbre of the speaker's emotional state, or alternatively, to highlight segments in which the speaker seemed unusually animated or exhibited strong emotion in the verbal delivery.

In accordance with another exemplary embodiment of the present invention, the communication is selectively marked for emotion analysis by a particular emotion analyzer, i.e., voice analyzer 232 or text/phrase analyzer 236. The selection of the emotion analyzer may be predicated on the efficiency, accuracy or availability of the emotion analyzers or on some other parameter. The relative usage of voice and text analysis in this combination will depend on multiple factors including machine resources available (voice analysis is typically more intensive), suitability for context etc. For instance, it is possible that one type of emotion analysis may derive emotion from the communication stream faster, but with slightly less accuracy, while the other analysis may derive a more accurate emotion inference from the communication stream, but slower. Thus, one analysis may be relied on primarily in certain situations and the other relied on as the primary analysis for other situations. Alternatively, one analysis may be used to deduce an emotion and the other analysis used qualify it before marking up the text with the emotion.

The communication markup may also be automated and used to selectively invoke either voice analysis or text/phrase analysis based on a predefined parameter. Emotion is extracted from a communication, within emotion markup component 210, by either or both of voice analyzer 232 and text/phrase analyzer 236. Text/phrase analyzer 236 text mines emotion-phrase dictionary 220 for the emotional state of the speaker based on words and phrases the speaker employs for conveying a message (or in the case of a textual communication, the punctuation and other lexicon and syntax that may infer emotional content). Voice analyzer 232 recognizes emotion by extracting voice patterns from the verbal communication that are indicative of emotion, that is the pitch, tone, cadence and amplitude of the verbal delivery that characterize emotion. Since the two emotion analysis techniques analyze different patterns in the communication, i.e., voice and text, the techniques can be used to resolve different emotion results. For instance, one emotion analysis may be devoted to an analysis of the overt emotional state of the speaker, while the other to the subtle emotional state of the speaker. Under certain circumstances a speaker may choose words carefully to mask overt emotion. However, unconscious changes in the pitch, tone, cadence and amplitude of the speaker's verbal delivery may indicate subtle or suppressed emotional content. Therefore, in certain communications, voice analyzer 232 may recognize emotions from the voice patterns in the communication that are suppressed by the vocabulary chosen by the speaker. Since the speaker avoids using emotion charged words, the text mining employed by text/phrase analyzer 236 would be ineffective in deriving emotions. Alternatively, a speaker may attempt to control his emotion voice patterns. In that case, text/phrase analyzer 236 may deduce emotions more accurately by text mining than voice analyzer 232 because the voice patterns are suppressed.

The automated communication markup may also identify the most accurate type of emotion analysis for the specific communication and use it to the exclusion of the other. There, both emotion analyzers are initially allowed to reach an emotion result and the results checked for consistency and against each other. Once one emotion analysis is selected over the other, the communication is marked for analysis using the more accurate method. However, the automated communication markup will randomly mark selections for a verification analysis with the unselected emotion analyzer. The automated communication markup may also identify the most efficient emotion analyzer for a communication (fastest with lowest error rate), mark the communication for analysis using only that analyzer and continually verify optimal efficiency in a similar manner.

As mentioned above, most emotion extraction processes can recognize nine or ten basic human emotions and perhaps two or three degrees or levels of each. However, emotion can be further categorized into other emotional states, e.g. love, joy/peace/pleasure, surprise, courage, pride, hope, acceptance/contentment, boredom, anticipation, remorse, sorrow, envy, jealousy/lust/greed, disgust/loathing, sadness, guilt, fear/apprehension, anger (distaste/displeasure/irritation to rage), and hate (although other emotion categories may be identifiable). Furthermore, more complex emotions may have more than two or three levels. For instance, commentators have referred to five, or sometimes seven, levels of anger; from distaste and displeasure to outrage and rage. In accordance with still another exemplary embodiment of the present invention, a hierarchal emotion extraction process is disclosed in which one emotion analyzer extracts the general emotional state of the speaker and the other determines a specific level for the general emotional state. For instance, text/phrase analyzer 236 is initially selected to text mine emotion-phrase dictionary 220 to establish the general emotional state of the speaker based on the vocabulary of the communication. Once the general emotional state has been established, the hierarchal emotion extraction process selects only certain speech segments for analysis by text/phrase analyzer 236. With the general emotion state of the speaker recognized, segments of the communication are then marked for analysis by voice analyzer 232.

In accordance with still another exemplary embodiment of the present invention, one type of analysis can be used for selecting a particular variant of the other type of analysis. For instance, the results of the text analysis (text mining) can be used as a guide, or for fine tuning, the voice analysis. Typically, a number of models are used for voice analysis and selecting the most appropriate model for a communication is mere guesswork. However, as the present invention utilizes text analysis, in addition to voice analysis, on the same communication, the text analysis can be used for selecting a subset of models that is suitable for the context of the communication. The voice analysis model may change between communications due to changes in the context of the communication.

As mentioned above, humans tend to refine their choice of emotion words and voice patterns with the context of the communication and over time. One training mechanism involves voice analyzer 232 continually updating the usage frequency scores associated with emotion words and voice patterns. In addition, some learned emotional content may be deduced from words and phrases used by the speaker. The user reviews the updated profile data from the voice analyzer 232 and accepts, rejects or accepts selected portions of the profile information. The accepted profile information is used to update the appropriate context profile for the speaker. Alternatively, some or all of the profile information will be automatically used for updating a context profile for the speaker, such as updating the usage frequency weights associated with predefined emotion words or voice patterns.

Markup engine 238 is configured as the output section of emotion markup component 210 and has the primary responsibility for marking up text with emotion metadata. Markup engine 238 receives a stream of text from transcriber 234 or textual communication directly from a textual source, i.e., from an email, instant message or other textual communication. Markup engine 238 also receives emotion inferences from text/phrase analyzer 236 and voice analyzer 232. These inferences may be in the form of standardized emotion metadata and immediately combined with the text. Alternatively, the emotion inferences are first transformed into standardized emotion metadata suitable for combining with the text. Markup engine 238 also receives emotion tags and emoticons from certain types of textual communications that contain emotion, e.g., emails, instant messages, etc. These types of emotion inferences can be mapped directly to corresponding emotion metadata and combined with the corresponding textual communication stream. Markup engine 238 may also receive and markup the raw communication stream with emotion metadata (such as raw voice or audio communication directly from a telephone, recording or microphone).

Markup engine 238 also receives a control signal corresponding with a markup selection. The control signal enables markup engine 238, if the engine operates in a normally OFF state, or alternatively, the control disables markup engine 238 if the engine operates in a normally ON state.

The text with emotion markup metadata is output from markup engine 238 to emotion translation component 250, for further processing, or to content management system 600 for archiving. Any raw communication with emotion metadata output from markup engine 238 may also be stored in content management system 600 as emotion artifacts for searches.

Figure 5:
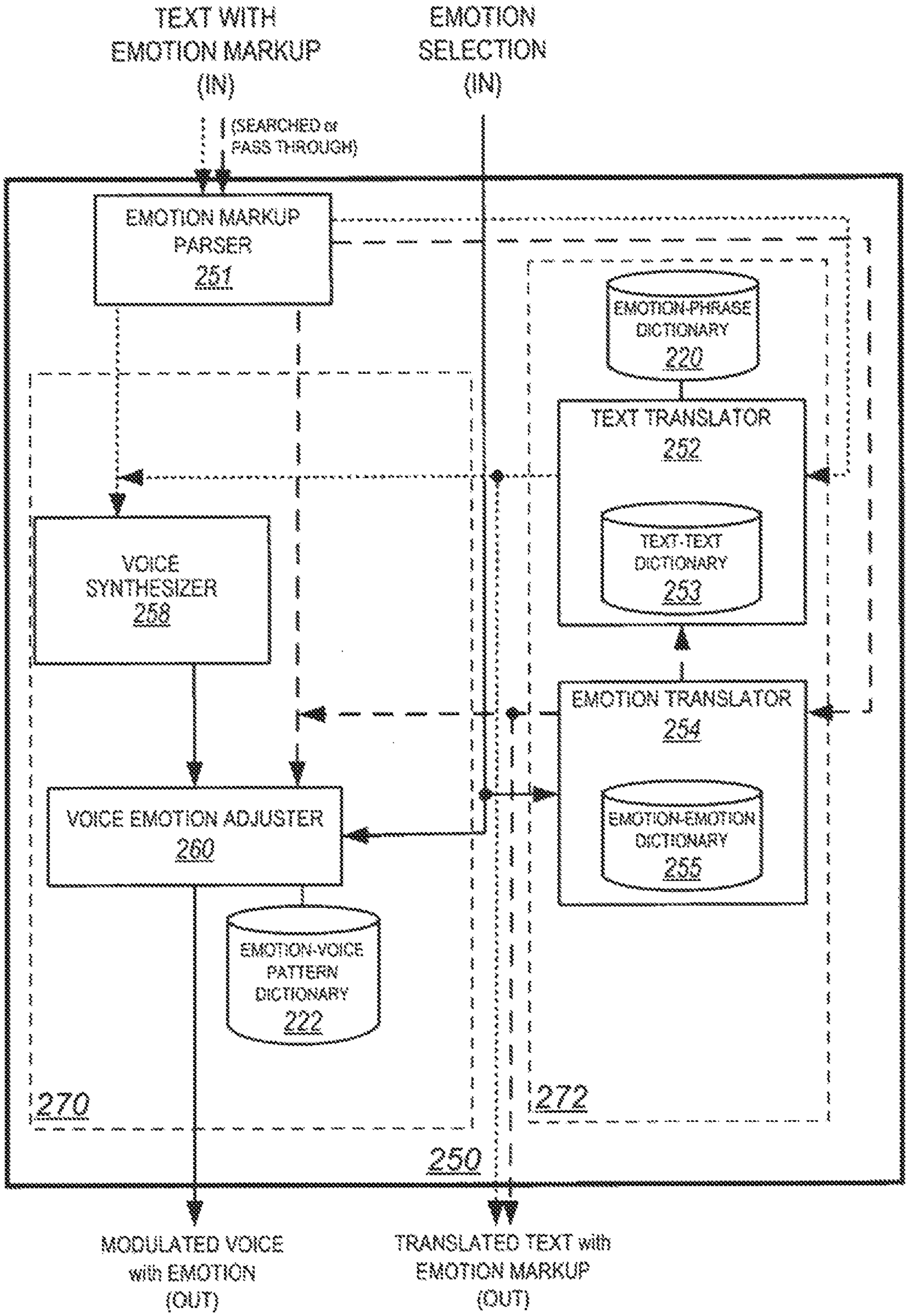
FIG. 5 is a diagram of the logical structure of an emotion translation component in accordance with an exemplary embodiment of the present invention.

Turning to FIG. 5, a diagram of the logical structure of emotion translation component 250 is shown in accordance with one exemplary embodiment of the present invention. The purpose of emotion translation component 250 is to efficiently translate text and emotion markup metadata to, for example, voice communication including accurately adjusting the tone, camber and frequency of the delivery, for emotion. Emotion translation component 250 translates text and emotion metadata into another dialect or language. Emotion translation component 250 may also emotion mine word and text patterns that are consistent with the translated emotion metadata for inclusion with the translated text. Emotion translation component 250 is configured to accept emotion markup metadata created at emotion markup component 210, but may also accept other emotion metadata, such as emoticons, emotion characters, emotion symbols and the like that may be present in emails and instant messages.

Emotion translation component 250 is comprised of two separate architectures: text and emotion translation architecture 272, and speech and emotion synthesis architecture 270. Text and emotion translation architecture 272 translates text, such as that received from emotion markup component 210, into a different language or dialect than the original communication. Furthermore, text and emotion translation architecture 272 converts the emotion data from the emotion metadata expressed in one culture to emotion metadata relevant to another culture using a set emotion to emotion definitions in emotion to emotion dictionary 255. Optionally, the culture adjusted emotion metadata is then used to modify the translated text with emotion words and text patterns that is common to the culture of the language. The translated text and translated emotion metadata might be used directly in textual communication such as emails and instant messages, or, alternatively, the translated emotion metadata are first converted to punctuation characters or emoticons that are consistent with the media. If voice is desired, the translated text and translated emotion metadata is fed into speech and emotion synthesis architecture 270 which modulates the text into audible word sounds and adjusts the delivery with emotion using the translated emotion metadata.

With further regard to text and emotion translation architecture 272, text with emotion metadata is received and separated by parser 251. Emotion metadata is passed to emotion translator 254 from text and text is forwarded to text translator 252. Text-to-text definitions within text-to-text dictionary 253 are selected by, for instance, a user, for translating the text into the user's language. If the text is English and the user French, the text-to-text definitions translate English to French. Text-to-text dictionary 253 may contain a comprehensive collection of text-to-text definitions for multiple dialects in each language. Text translator 252 text mines internal text-to-text dictionary 253 with input text for text in the users language (and perhaps dialect). Similarly to the text translation, emotion translator 254 emotion mines emotion-to-emotion dictionary 255 for matching emotion metadata consistent with the culture of the translated language. The translated emotion metadata more accurately represents the emotion from the perspective of the culture of the translated language, i.e., the user's culture.

Text translator 252 is also ported to receive the translated emotion metadata from emotion translator 254. With this emotion information, text translator 252 can text mine emotion-text/phrase dictionary 220 for words and phrases that convey the emotion, but for the culture of the listener. As a practical matter, text translator 252 actually emotion mines words, phrases, punctuation and other lexicon and syntax that correlate to the translated emotion metadata received from emotion translator 354.

An emotion selection control signal may also be received at emotion translator 254 of emotion translation architecture 272, for selectively translating the emotion metadata. In an email or instant message, the control signal may be highlighting or the like, which instructs emotion translation architecture 272 to the presence of emotion markup with the text. For instance, the author of a message can highlight a portion of it, or mark a portion of a response and, associate emotions with it. This markup will be used by emotion translation architecture 272 to introduce appropriate frequency and pitch when that portion is delivered as speech.

Optionally, emotion translator 254 may also produce emoticons or other emotion characters that can be readily combined with the text produced at text translator 252. This text with emoticons is readily adaptable to email and instant messaging systems.

It should be reiterated, emotion-text/phrase dictionary 220 contains a dictionary of bi-directional emotion-text/phrase definitions (including words, phrases, punctuation and other lexicon and syntax) that are selected, modified and weighted according to profile information provided to emotion translation component 250, which is based on the context of the communication. In the context of the discussion of emotion markup component 210, profile information is related to the speaker, but more correctly the profile information relates to the person in control of the appliance utilizing the emotion markup component. Many appliances utilize both emotion translation component 250 and emotion markup component 210, which are separately ported to emotion-text/phrase dictionary 220. Therefore, the bi-directional emotion-text/phrase definitions are selected, modified and weighted according to the profile of the owner of the appliance (or the person in control of the appliance). Thus, when the owner is the speaker of the communication (or author of written communication), the definitions are used to text mine emotion from words and phrases contained in the communication. Conversely, when the owner is the listener (or recipient of the communication), the bi-directional definitions are used to text mine words and phrases that convey the emotional state of the speaker based on the emotion metadata accompanying the text.

With regard to emotion synthesis architecture 270, text and emotion markup metadata are utilized for synthesizing human speech. Voice synthesizer 258 receives input text or text that has been adjusted for emotion from text translator 252. The synthesis proceeds using any well known algorithm, such as an HMM based speech synthesis. In any case, the synthesized voice is typically output as monotone audio with regular frequency and a constant amplitude, that is, with no recognizable emotion voice patterns.

The synthesized voice is then received at voice emotion adjuster 260, which adjusts the pitch, tone and amplitude of the voice and changes the frequency, or cadence, of the voice delivery based on the emotion information it receives. The emotion information is in the form of emotion metadata that may be received from a source external to emotion translation component 250, such as an email or instant message, a search result, or may instead be translated emotion metadata from emotion translator 254. Voice emotion adjuster 260 retrieves voice patterns corresponding to the emotion metadata from emotion-voice pattern dictionary 222. Here again, the emotion to voice pattern definitions are selected using the context profiles for the user, but in this case the user's unique personality profiles are typically omitted and not used for making the emotion adjustment.

An emotion selection control signal is also received at voice emotion adjuster 260 for selecting synthesized voice with emotion voice pattern adjustment. In an email or instance message, the control signal may be highlighting or the like, which instructs voice emotion adjuster 260 to the presence of emotion markup with the text. For instance, the author of a message can highlight a portion of it, or mark a portion of a response and, associate emotions with it. This markup will be used by emotion synthesis architecture 270 to enable voice emotion adjuster 260 to introduce appropriate frequency and pitch when that portion is delivered as speech.

As discussed above, once the emotional content of a communication has been analyzed and emotion metadata created, the communication may be archived. Ordinarily only text and the accompanying emotion metadata are archived as an artifact of communication's context and emotion, because the metadata preserves the emotion from the original communication. However, in some cases the raw audio communication is also archived, such as for training data. The audio communication may also contain a data track with corresponding emotion metadata.

Figure 6:
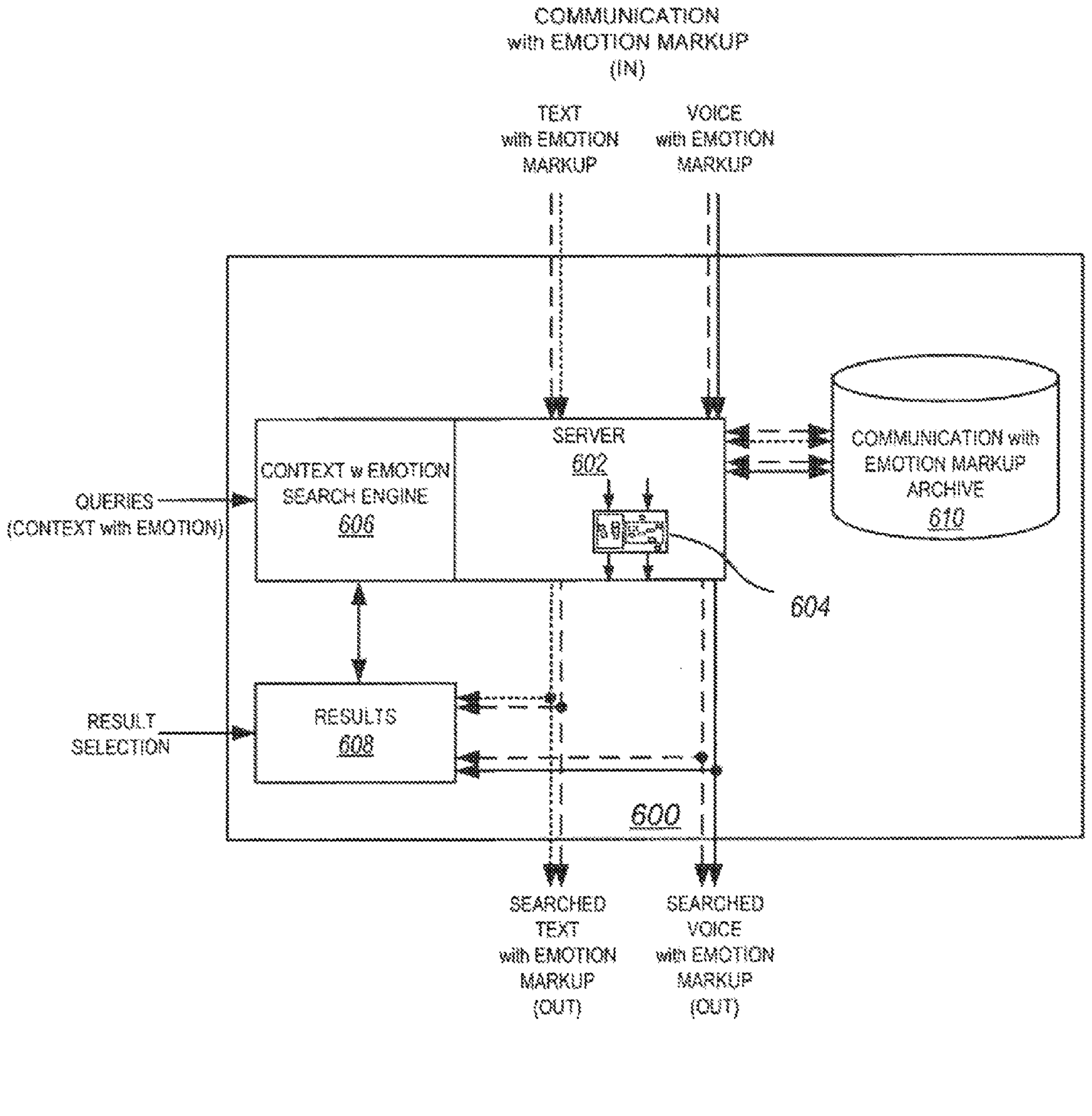
FIG. 6 is a diagram of the logical structure of a content management system in accordance with one exemplary embodiment of the present invention.

With regard to FIG. 6, a content management system is depicted in accordance with one exemplary embodiment of the present invention. Content management system 600 may be connected to any network, the Internet or may instead be a stand alone device such as a local PC, laptop or the like. Content management system 600 includes a data processing and communications component, server 602, and a storage, archival database 610. Server 602 further comprises context with emotion search engine 606 and, optionally, may include embedded emotion communication architecture 604. Embedded emotion communication architecture 604 is not necessary for performing context with emotion searches, but is useful for training context profiles or offloading processing from a client.

Text and word searching is extremely common, however, sometimes what is being spoken is not as important as how it is being said, that is not the words, but how the words are delivered. For example, if an administrator wants examples of communications between coworkers in the workplace which exhibit a peaceful emotional state, or contented feeling, the administrator will perform a text search. Before searching, the administrator must identify specific words that are used in the workplace that demonstrate a peaceful feeling and then search for communications with those words. The word "content" might be considered for a search term. While text search might return some accurate hits, such as where the speaker makes a declaration, "I am content with . . . ," typically those results would be masked by other inaccurate hits, in which the word "content" was used in the abstract, as a metaphor, or any communication discussing the emotion of contentment. Furthermore, because the word "content" is a homonym, a text search would also produce inaccurate hits for its other meanings.

In contrast, and in accordance with one exemplary embodiment of the present invention, a database of communications may be searched based on a communication context and an emotion. A search query is received by context with emotion search engine 606 within server 602. The query specifies, at least an emotion. Search engine 606 then searches the emotion metadata of the communication archival database 610 for communications with the emotion. Results 608 are then returned that identify communications with the emotion and with relevant passages from the communications corresponding to the metadata, that exhibit the emotion. Results 608 are forwarded to the requestor for a final selection or for refinement.

Mere examples of communications with an emotion are not particularly useful; but what is useful is how a specific emotion is conveyed in a particular context, e.g., between a corporate officer and shareholders at an annual shareholder meeting, between supervisor and subordinates in a teleconference, or a sales meeting, or with a client present, or an investigation, or between a police officer and suspect in an interrogation, or even a U.S. President and the U.S. Congress at a State of the Union Address. Thus, the query also specifies a context for the communication in which a particular emotion may be conveyed.

With regard to the previous example, if an administrator wishes to understand how an emotion, such as peacefulness or contentment, is communicated between coworkers in the workplace, the administrator places a query with context with emotion search engine 606. The query identifies the emotion, "contentment," and the context of the communication, the relationships between the speaker and audience, for instance coworkers and may further specify a contextual media, such as voicemail. Search engine 606 then searches all voicemail communications between the coworkers that are archived in archival database 610 for peaceful or content emotion metadata. Results 608 are then returned to the administrator which include exemplarily passages that demonstrate a peacefulness emotional content for the resultant email communications. The administrator can then examine the exemplary passages, and select the most appropriate voicemail for download based on the examples. Alternatively, the administrator may refine the search and continue.

As may be appreciated from the foregoing, optionally, search engine 606 performs its search on the metadata associated with the communication and not the textual or audio content of the communication itself. Furthermore, emotion search results 608 are returned from the text with emotion markup and not the audio.

In accordance with another exemplary embodiment of the present invention, a database of foreign language communications is searched on the basis of a context and an emotion, with the resulting communication translated into the language of the requestor, modified with replacement words that are appropriate for the specified emotion and consistent with the culture of the translated language, and then the resulting communication is modulated as speech, in which the speech patterns are adjusted for the specified emotion and consistent with the culture of the translated language. Thus, persons from one country can search archival records of communication in another country for emotion and observe how the emotion is translated in their own language. As mentioned previously, the basic human emotions may transcend cultural barriers; therefore the emotion markup language used to create the emotion metadata may be transparent to language. Thus, only the context portion of the query need be translated. For this case, a requestor issues a query from emotion translation component 250 that is received at context with emotion search engine 606. Any portion of the query that needs to be translated is fed to the emotion translation component of embedded emotion communication architecture 604. Search engine 606 performs its search on the metadata associated with the archived communications and realizes a result.

Because the search is across a language barrier, the results are translated prior to viewing by the requestor. The translation may be performed locally at emotion translation component 250 operated by the user, or by emotion communication architecture 604 and results 608 communicated to the requestor in translated form. In any case, both the text and emotion are translated consistently with the requestor's language. Here again, the requestor reviews the result and selects a particular communication. The resulting communication is then translated into the language of the requestor, modified with replacement words that are appropriate for the specified emotion and consistent with the culture of the translated language. Additionally, the requestor may choose to listen to the communication rather than view it. The result communication is modulated as natural speech, in which the speech patterns are adjusted for the specified emotion that is consistent with the culture of the translated language.

As mentioned above, the accuracy of the emotion extraction process, as well as the translation with emotion process, depends on creating and maintaining accurate context profile information for the user. Context profile information can be created, or at least trained, at content management system 600 and then used to update context profile information in profile databases located on the various devices and computers accessible by the user. Using content management system 600, profile training can be performed as a background task. This assumes the audio communication has been archived with the emotion markup text. A user merely selects the communications by context and then specifies which communications under the context should be used as training data. Training proceeds as described above on the audio stream with voice analyzer 232 continually scoring emotion words and voice patterns by usage frequency.

Figure 7:
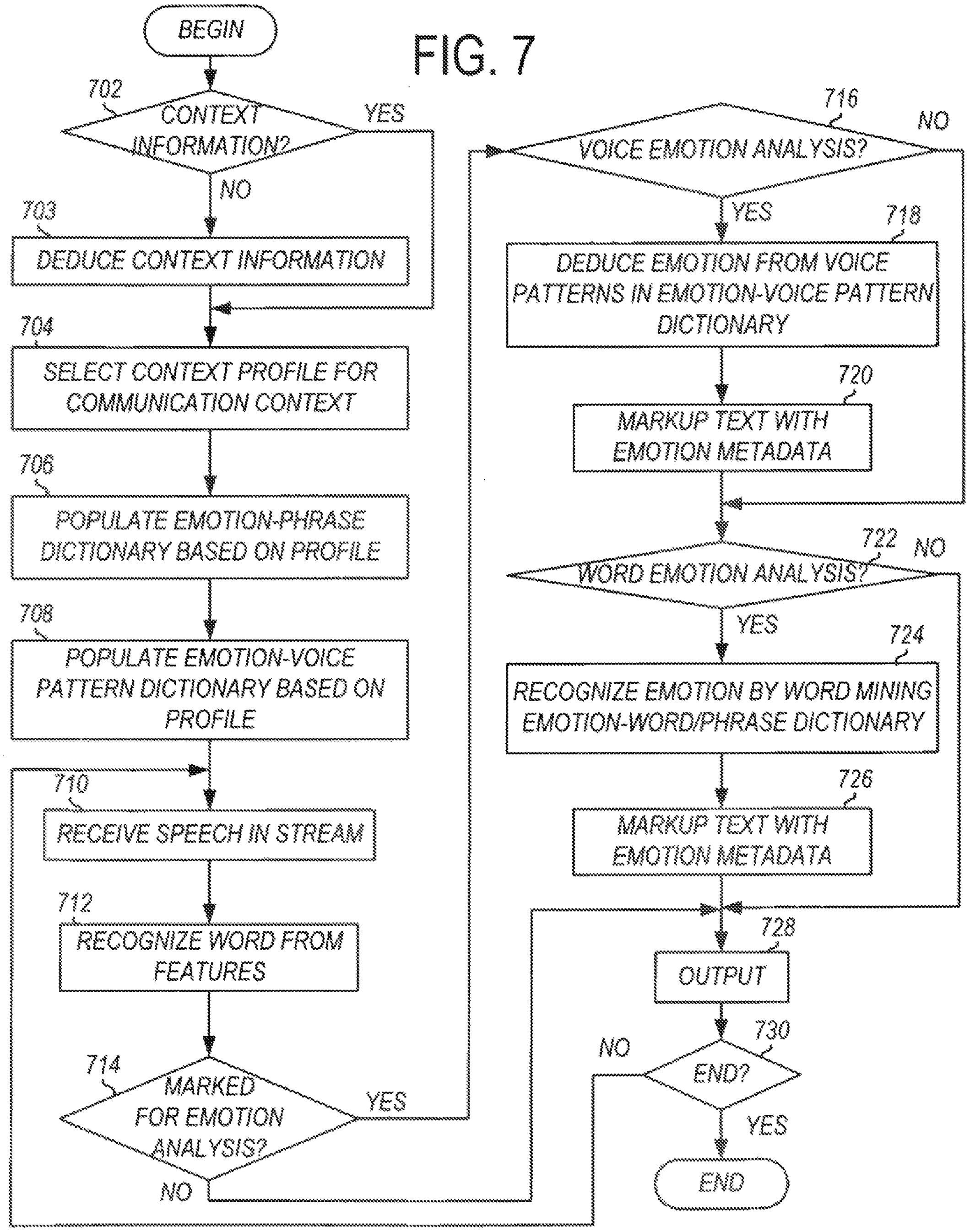
FIG. 7 is a flowchart depicting a method for recognizing text and emotion in a communication and preserving the emotion in accordance with an exemplary embodiment of the present invention.

FIG. 7 is a flowchart depicting a method for recognizing emotion in a communication in accordance with an exemplary embodiment of the present invention. The process begins by determining the context of the conversation, i.e., who are the speaker and audience and what is the circumstance for the communication (step 702). The purpose of the context information is to identify context profiles used for populating a pair of emotion dictionaries, one used for emotion text analysis and the other used for emotion voice analysis. Since most people alter their vocabulary and speech patterns, i.e., delivery, for their audience and circumstance, knowing the context information allows for highly accurate emotion deductions, because the dictionaries can be populated with only the most relevant definitions under the context of the communication. If the context information is not known, sometimes it can be deduced (step 703). For example, if the speaker/user sends a voice message to a friend using a PC or cell phone, the speaker's identification can be assumed to the owner of the appliance and the audience can be identified from an address book or index used to send the message. The circumstance is, of course, a voice correspondence. The context information is then used for selecting the most appropriate profiles for analyzing the emotional content of the message (step 704). It is expected that every appliance has a multitude of comprehensive emotion definitions available for populating the dictionaries: emotion text analysis definitions for populating the text mining dictionary and emotion voice analysis definitions for populating the voice analysis dictionary (steps 706 and 708). The profile information will specify speaker information, such as his language, dialect and geographic region. The dictionaries may be populated with emotion definitions relevant to only that information. In many situations, this information is sufficient for achieving acceptable emotion results. However, the profile information may also specify audience information, that is, the relationship of the audience to the speaker. The dictionaries are then populated with emotion definitions that are relevant to the audience, i.e., emotion text and voice patterns specifically relevant to the audience.

With the dictionaries, the communication stream is received (step 710) and voice recognition proceeds by extracting a word from features in the digitized voice (step 712). Next, a check is made to determine if this portion of the speech, essentially just the translated word, has been selected for emotion analysis (step 714). If this portion has not been selected for emotion analysis, the text is output (step 728) and the communication checked for the end (step 730). If not, the process returns to step 710, more speech is received and voice recognized for additional text (step 712).

Returning to step 714, if the speech has been designated for emotion analysis, a check is made to determine if emotion voice analysis should proceed (step 716). As mentioned above and throughout, the present invention selectively employs voice analysis and text pattern analysis for deducing emotion form a communication. In some cases, it may be preferable to invoke one analysis over the other or both simultaneously, or neither. If emotion voice analysis should not be used for this portion of the communication, a second check is made to determine if emotion text analysis should proceed (step 722). If emotion text analysis is also not to be used for this portion either, the text is output without emotion markup (step 728) and the communication checked for the end (step 730) and iterates back to step 710.

If at step 716, it is determined that the emotion voice analysis should proceed, voice patterns in the communication are checked against emotion voice patterns in the emotion-voice pattern dictionary (step 718). If an emotion is recognized for the voice patterns in the communication, the text is marked up with metadata representative of the emotion (step 720). The metadata provides the user with a visual clue to the emotion preserved from the speech communication. These clues may be a highlight color, and emotion character or symbol, text format, or an emoticon. Similarly, if at step 722, it is determined that the emotion text analysis should proceed, text patterns in the communication are analyzed. This is accomplished by text mining the emotion-phrase dictionary for the text from the communication (step 724). If a match is found, the text is again marked up with metadata representative of the emotion (step 724). In this case, the text with emotion markup is output (step 728) and the communication checked for the end (step 730) and iterates back to step 710 until the end of the communication. Clearly, under some circumstances it may be beneficial to arbitrate between the emotion voice analysis and emotion text analysis, rather than duplicating the emotion markup on the text. For example, one may cease if the other reaches a result first. Alternatively, one may provide general emotion metadata and the other may provide more specific emotion metadata, that is one deduces the emotion and the other deduces the intensity level of the emotion. Still further, one process may be more accurate in determining certain emotions than the other, so the more accurate analysis is used exclusively for marking up the text with that emotion.

Figure 8A:
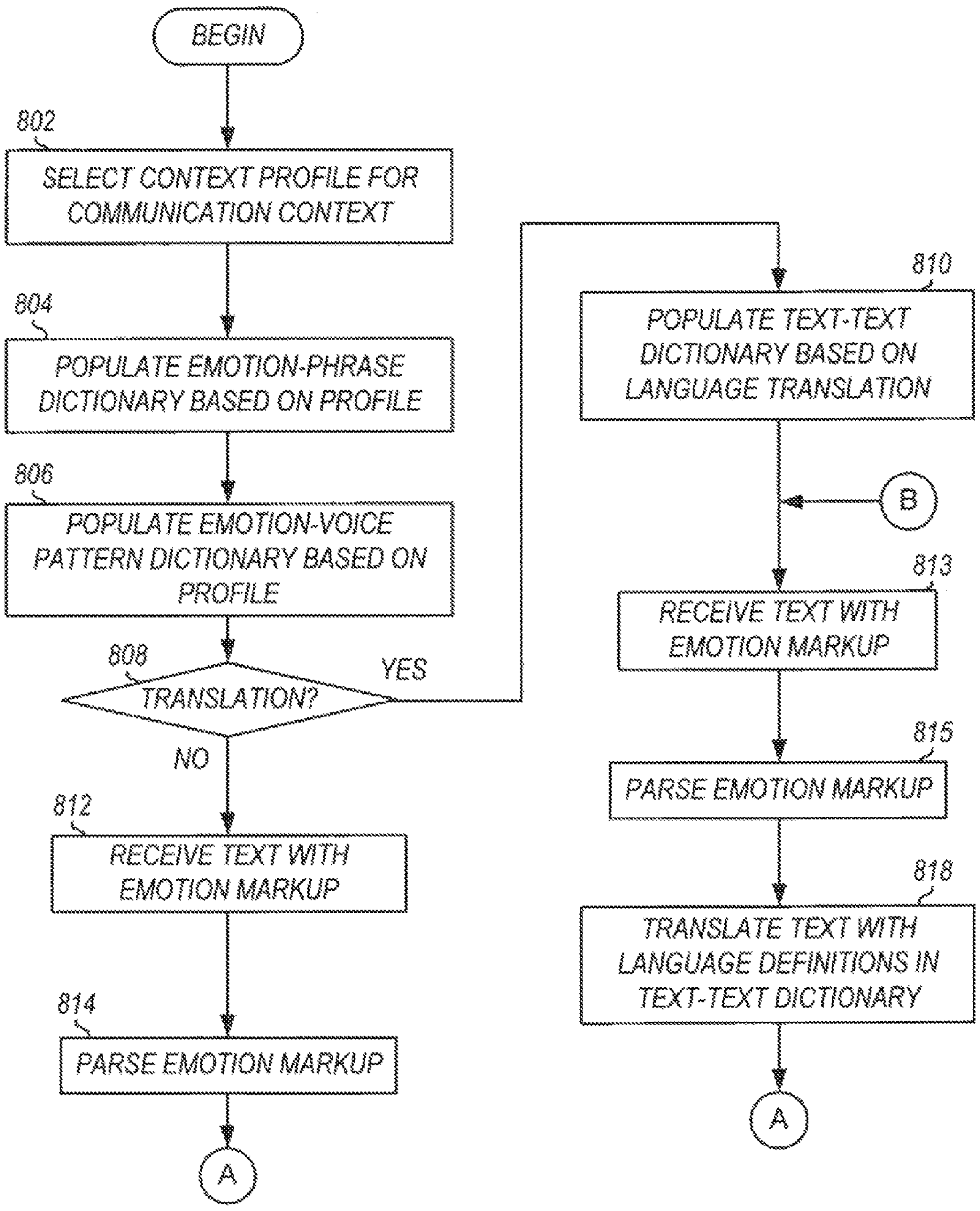
FIGS. 8A and 8B are flowcharts that depict a method for converting a communication while preserving emotion in accordance with an exemplary embodiment of the present invention.
Figure 8B:
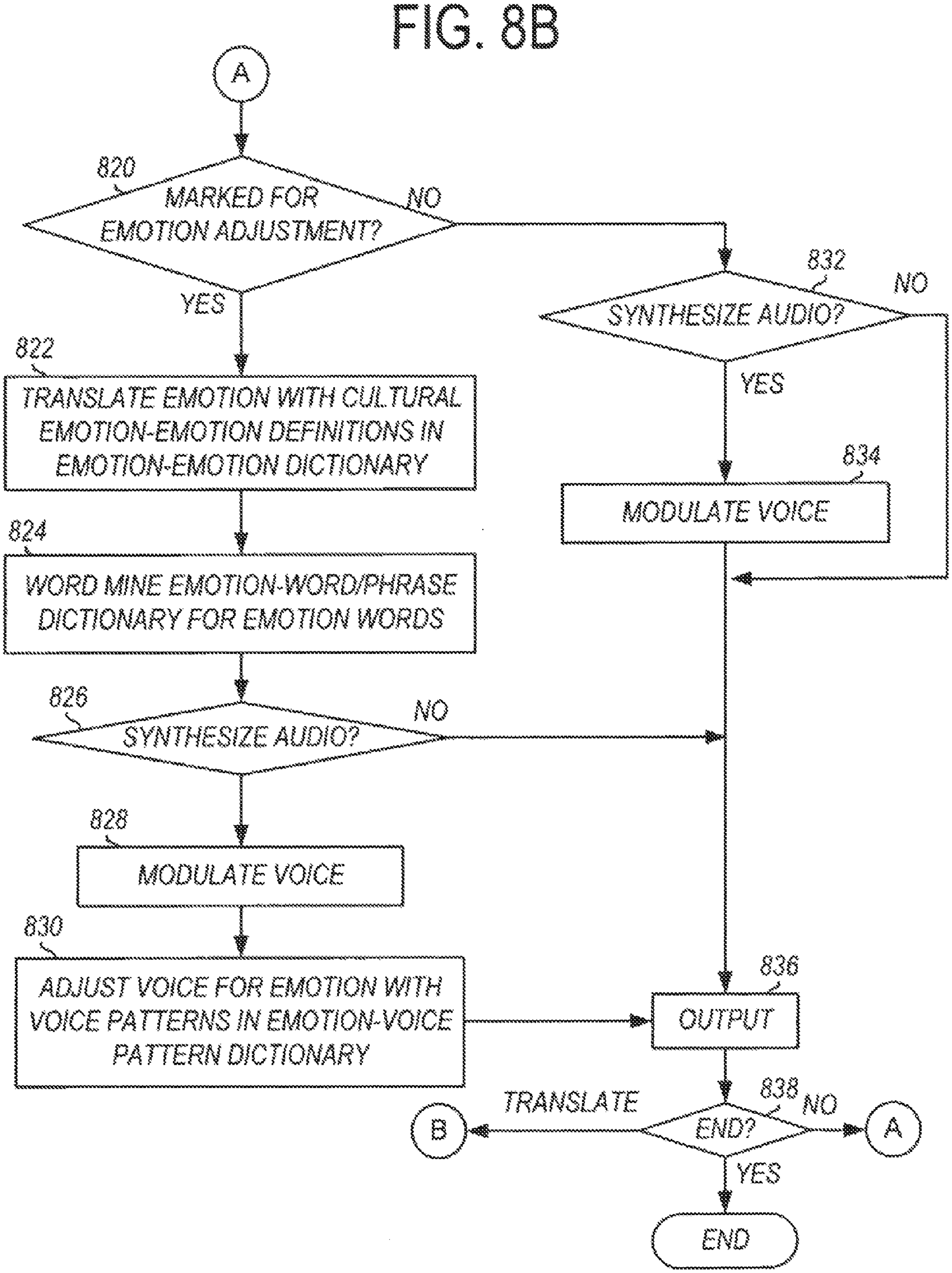

FIGS. 8A and 8B are flowcharts that depict a method for preserving emotion between different communication mechanisms in accordance with an exemplary embodiment of the present invention. In this case the user is typically not the speaker but is a listener or reader. This process is particularly applicable for situations where the user is receiving instant messages from another or the user has accessed a text artifact of a communication. The most appropriate context profile is selected for the listener in the context of the communication (step 802). Emotion text analysis definitions populate the text mining dictionary and emotion voice analysis definitions populate the voice analysis dictionary based on the listener profile information (steps 804 and 806). Next, a check is made to determine if a translation is to be performed on the text and emotion markup (step 808). If not, the text with emotion markup is received (step 812) and the emotion information is parsed (step 814). A check in then made to determine whether the text is marked for emotion adjustment (step 820). Here, the emotion adjustment refers to accurately adjusting the tone, camber and frequency of a synthesized voice for emotion. If the adjustment is not desired, a final check is made to determine whether to synthesize the text into audio (step 832). If not, the text is output with the emotion markup (step 836) and checked for the end of the text (step 838). If more text is available, the process reverts to step 820 for completing the process without translating the text. If, instead, at step 832, it is decided to synthesize the text into audio, the text is modulated (step 834) and output as audio (step 836).

Returning to step 820, if the text is marked for emotion adjustment, the emotion metadata is translated with the cultural emotion to emotion definitions in emotion to emotion dictionary (step 822). The emotion to emotion definitions do not alter the format of the metadata, as that is transparent across languages and cultures, but is does adjust the magnitude of the emotion for cultural differences. For instance, if the level of an emotion is different between cultures, the emotion to emotion definitions adjust the magnitude to be consistent with the user's culture. In any case, the emotion to word/phrase dictionary is then text (emotion) mined for words that convey the emotion in the culture of the user (step 824). This step adds words that convey the emotion to the text. A final check is made to determine whether to synthesize the text into audio (step 826) and if so the text is modulated (step 828) and the tone, camber and frequency of synthesized voice is adjusted for emotion (step 830) and output as audio with emotion (step 836).

Returning to step 808, if the text and emotion markup are to be translated, the text to text dictionary is populated with translation from the original language of the text and markup, to the language of the user (step 810). Next, the text with emotion markup is received (step 813) and the emotion information is parsed (step 815). The text is translated from the original language to the language of the user with the text to text dictionary (step 818). The process then continues by checking if the text is marked for emotion adjustment (step 820), and the emotion metadata is translated to the user's cultural using the definitions in emotion to emotion dictionary (step 822). The emotion to word/phrase dictionary is emotion mined for words that convey the emotion consistent with the culture of the user (step 824). And a check is made to determine whether to synthesize the text into audio (step 826). If not, the translated text (with the translated emotion) is output (step 836). Otherwise, the text is modulated (step 828) the modulated voice is adjusted for emotion by altering the tone, camber and frequency of synthesized voice (step 830). The synthesized voice with emotion is the output (step 836). The process reiterates from step 813 until all the text has been output as audio and the process ends.

Figure 9:
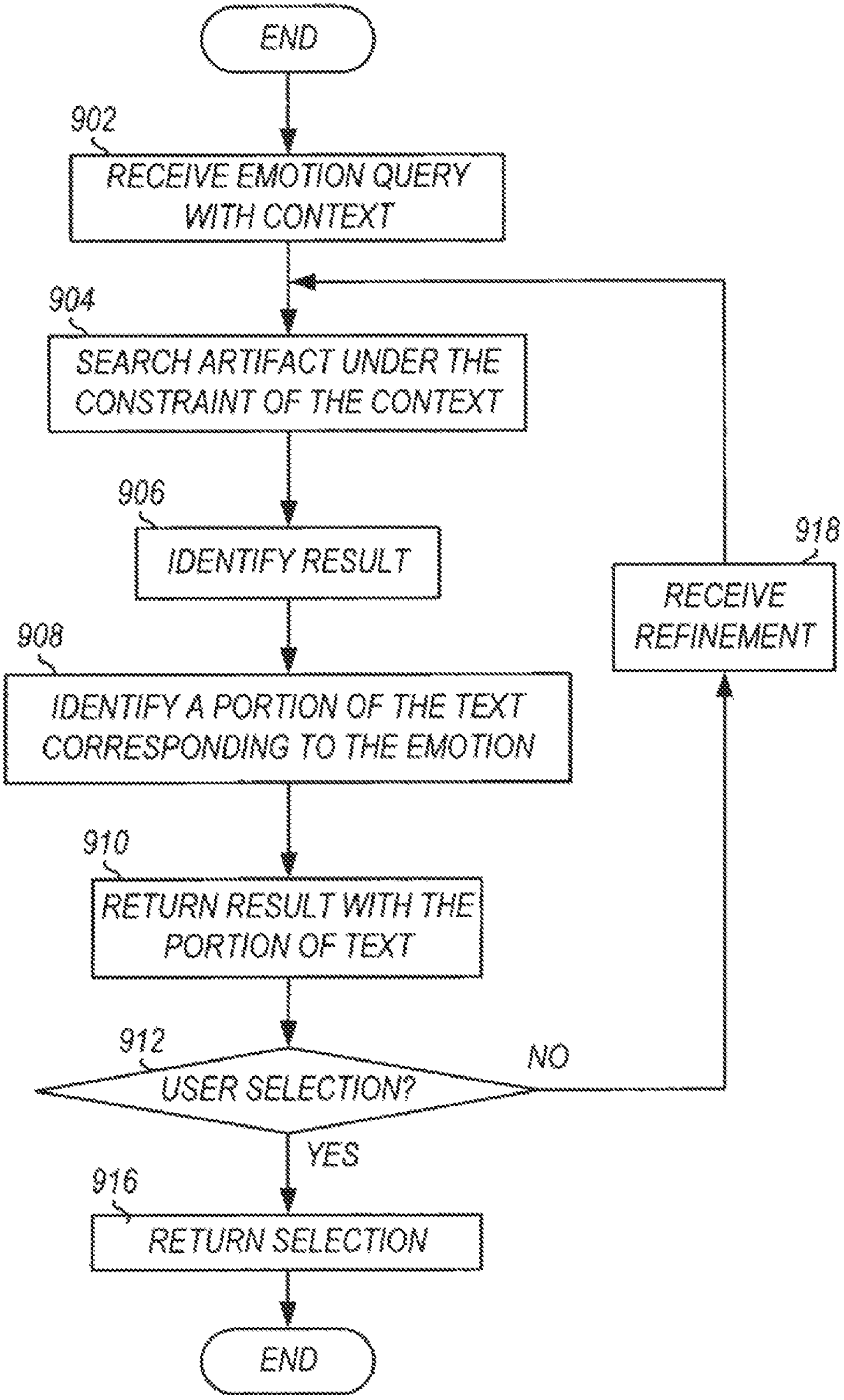
FIG. 9 is flowchart that depicts a method for searching a database of communication artifacts by emotion and context while preserving emotion in accordance with an exemplary embodiment of the present invention.

FIG. 9 is flowchart that depicts a method for searching a database of voice artifacts by emotion and context while preserving emotion in accordance with an exemplary embodiment of the present invention. An archive contains voice and/or speech communications artifacts that are stored as text with emotion markup and represent original voice communication with emotion preserved as emotion markup. The process begins with a query for artifact with an emotion under a particular context (step 902). For example, the requested may wish to view an artifact with the emotion of "excitement" in a lecture. In response to the request, all artifacts are searched for the request emotion metadata, excitement, in the context of the query, lectures (step 904). The search results are identified (step 906) and a portion of the artifact corresponding to "excitement" metadata is reproduced in a result (step 908) and returned to the requestor (step 910). The user then selects an artifact (step 912) and the corresponding text and markup is transmitted to the requestor (step 916). Alternatively, the requestor returns a refined query (step 918) which is searched as discussed directly above.

It should be understood that the artifacts are stored as text with markup, in the archive database, but were created from, for example, a voice communication with emotion. The emotion is transformed into emotion markup and the speech into text. This mechanism of storing communication preserves the emotion as metadata. The emotion metadata is transparent to languages, allowing the uncomplicated searching of foreign language text by emotion. Furthermore, because the communication artifacts are textual, with emotion markup, they can be readily translated into another language. Furthermore, synthesized voice with emotion can be readily generated for any search result and/or translation using the process described above with regard to FIGS. 8A and 8B.

The discussion of the present invention may be subdivided into three general embodiments: converting text with emotion markup metadata to voice communication, with or without language translation (FIGS. 2, 5 and 8A-B); converting voice communication to text while preserving emotion of the voice communication using two independent emotion analysis techniques (FIGS. 2, 3 and 7); and searching a database of communication artifacts by emotion and context and retrieving results while preserving emotion (FIGS. 6 and 9). While aspects of each of these embodiments are discussed above, these embodiments may be embedded in a variety of devices and appliances to support various communications which preserve emotion content of that communication and between communication channels. The following discussion illustrates exemplary embodiments for implementing the present invention.

Figure 10:
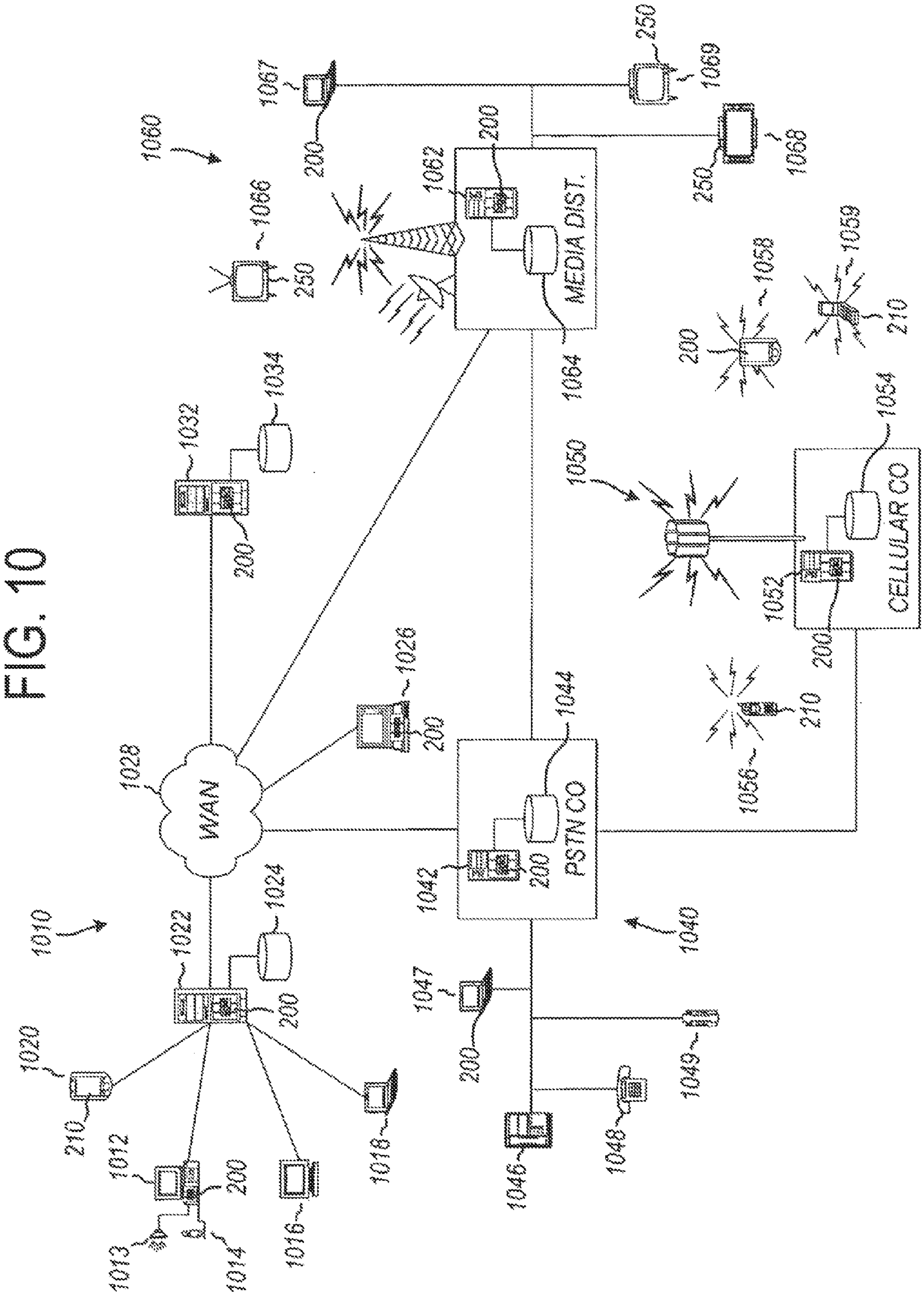
FIG. 10 is a diagram depicting various exemplary network topologies with devices incorporating emotion handling architectures for generating, processing and preserving the emotion content of a communication in accordance with an exemplary embodiment of the present invention.

FIG. 10 is a diagram depicting various exemplary network topologies with devices incorporating emotion handling architectures for generating, processing and preserving the emotion content of a communication. It should be understood that the network topologies depicted in the figure are merely exemplary for the purpose of describing aspects of the present invention. The present figure is subdivided into four separate network topologies: information (IT) network 1010; PSTN network (landline telephone) 1040; wireless/cellular network 1050 and media distribution network 1060. Each network may be considered as supporting a particular type of content, but as a practical matter each network supports multiple content types. For instance, while IT network 1010 is considered a data network, the content of the data may take the form of an information communication, voice and audio communication (voice emails, VoIP telephony, teleconferencing and music), multimedia entertainment (movies, television and cable programs and videoconferencing). Similarly, wireless/cellular network 1050 is considered a voice communication network (telephony, voice emails and teleconferencing); it may also be used for other audio content such as receiving on demand music or commercial audio programs. In addition, wireless/cellular network 1050 will support data traffic for connecting data processing devices and multimedia entertainment (movies, television and cable programs and videoconferencing). Similar analogies can be made for PSTN network 1040 and media distribution network 1060.

With regard to the present invention, emotion communication architecture 200 may be embedded on certain appliances or devices connected to these networks or the devices may separately incorporate either emotion markup component 210 or emotion translation component 250. The logical elements within emotion communication architecture 200, emotion markup component 210 and emotion translation component 250 are depicted in FIGS. 2, 3 and 5, while the methods implemented in emotion markup component 210 and emotion translation component 250 are illustrated in the flowcharts illustrated in FIGS. 7 and, 8A and 8B, respectively.

Turning to IT network 1010, that network topology comprises a local area network (LAN) and a wide area network (WAN) such as the Internet. The LAN topology can be defined from a boundary router, server 1022, and the local devices connected to server 1022 (PDA 1020, PCs 1012 and 1016 and laptop 1018). The WAN topology can be defined as the networks and devices connected on WAN 1028 (the LAN including server 1022, PDA 1020, PCs 1012 and 1016 and laptop 1018, and server 1032, laptop 1026), it is expected that some or all of these devices will be configured with internal or external audio input/output components (microphones and speakers), for instance PC 1012 is shown with external microphone 1014 and external speaker(s) 1013.

This network device may also be configured with local or remote emotion processing capabilities. Recall that emotion communication architecture 200 comprises emotion markup component 210 and emotion translation component 250.

Recall also that emotion markup component 210 receives a communication that includes emotion content (such as human speech with speech emotion) and recognizes the words and emotion in the speech and outputs text with emotion markup, thus the emotion in the original communication is preserved. Emotion translation component 250, on the other hand, receives a communication that typically includes text with emotion markup metadata, modifies and synthesizes the text into a natural language and adjusts the tone, cadence and amplitude of the voice delivery for emotion based on the emotion metadata accompanying the text. Now these network devices process and preserve the emotion content of a communication may be more clearly understood by way of examples.

In accordance with one exemplary embodiment of the present invention, text with emotion markup metadata is converted to voice communication, with or without language translation. This aspect of the invention will be discussed with regard to instant messaging (IM). A user of a PC, laptop, PDA, cell phone, telephone or other network appliance creates a textual message that includes emotion inferences, for instance using one of PCs 1012 or 1016, one of laptops 1018, 1026, 1047 or 1067, one of PDAs 1020 or 1058, one of cell phones 1056 or 1059, or even using one of telephones 1046, 1048, or 1049. The emotion inferences may include emoticons, highlighting, punctuation or some other emphasis indicative of emotion. In accordance with one exemplary embodiment of the present invention, the device that creates the message may or may not be configured with emotion markup component 210 for marking up the text. In any case, the text message with emotion markup is transmitted to a device that includes emotion translation component 250, either separately, or in emotion communication architecture 200, such as laptop 1026. The emotion markup should be in a standard format or contain standard markup metadata that can be recognized as emotion content by emotion translation component 250. If it is not recognizable, the text and non-standard emotion markup can be processed into standardized emotion markup metadata by any device that includes emotion markup component 210, using the sender's profile information (see FIG. 4).

Once the text and emotion markup metadata are received at emotion translation component 250, the recipient can choose between content delivery modes, e.g., text or voice. The recipient of the text message may also specify a language for content delivery. The language selection is used for populating text-to-text dictionary 253 with the appropriate text definitions for translating the text to the selected language. The language selection is also used for populating emotion-to-emotion dictionary 255 with the appropriate emotion definitions for translating the emotion to the culture of the selected language, and for populating emotion-to-voice pattern dictionary 222 with the appropriate voice pattern definitions for adjusting the synthesized audio voice for emotion. The language selection also dictates which word and phrase definitions are appropriate for populating emotion-to-phrase dictionary 220, used for emotion mining for emotion charged words that are particular to the culture of the selected language.

Optionally, the recipient may also select a language dialect for the content delivery, in addition to selecting the language, for translating the textual and emotion content into a particular dialect of the language. In that case, each of the text-to-text dictionary 253, emotion-to-emotion dictionary 255, emotion-to-voice pattern dictionary 222 and emotion-to-phrase dictionary 220 are modified, as necessary, for the language dialect. A geographic region may also be selected by the recipient, if desired, for altering the content delivery consistent with a particular geographic area. Still further, the recipient may also desire the content delivery to match his own communication personality. In that case, the definitions in each of the text-to-text, emotion-to-emotion, emotion-to-voice pattern and emotion-to-phrase dictionaries are further modified with the personality attributes from the recipient's profile. In so doing, the present invention will convert the text and standardized emotion markup into text (speech) that is consistent with that used by the recipient, while preserving and converting the emotion content consistent with that used by the recipient to convey his emotional state. With the dictionary definitions updated, the message can then be processed.

Emotion translation component 250 can produce a textual message or an audio message. Assuming the recipient desires to convert the incoming message to a text message (while preserving the emotion content), emotion translation component 250 receives the text with emotion metadata markup and emotion translator 254 converts the emotion content derived from the emotion markup in the message to emotion inferences that are consistent with the culture of the selected language. Emotion translator 254 uses the appropriate emotion-to-emotion dictionary for deriving these emotion inferences and produces translated emotion markup. The translated emotion is passed to text translator 252. There, text translator 252 translates the text from the incoming message to the selected language (and optionally translates the message for dialect, geographic region and personality) using the appropriate definitions in text-to-text dictionary 253. The emotion metadata can aid in choosing the right words, word phrases, lexicon, and or syntax in the target language from emotion-phrase dictionary 220 to convey emotion in the target language. This is the reverse of using text analysis for deriving emotion information using emotion-phrase dictionary 220 in emotion markup component 210, hence bidirectional dictionary are useful. First, the text is translated from source language to the target language, for instance English to French. Then, if there is an emotion like sadness associated with English text, the appropriate French words will be used in the final output of the translation. Also note, the emotion substitution from emotion-phrase dictionary 220 can as simple as a change in syntax, such as the punctuation, or more a complex modification of the lexicon, such as inserting or replacing a phrase of the translated text of the target language.

Returning to FIG. 5, using the emotion information from emotion translator 254, text translator 252 emotion mines emotion-to-phrase dictionary 220 for emotion words that convey the emotion of the communication. If the emotion mining is successful, text translator 252 includes the emotion words, phrases or punctuation, for corresponding words in the text because the emotion words more accurately convey the emotion from the message consistent with the recipient's culture. In some case, translated text will be substituted for the emotion words derived by emotion mining. The translated textual content of the message, with the emotion words for the culture, can then be presented to the recipient with emotion markup translated from the emotion content of the message for the culture.

Alternatively, if the recipient desires the message be delivered as an audio message (while preserving the emotion content), emotion translation component 250 processes the text with emotion markup as described above, but passes the translated text with the substituted emotion words to voice synthesizer 258 which modulates the text into audible sounds. Typically, a voice synthesizer uses predefined acoustic and prosodic information that produces a modulated audio with a monotone audio expression having a predetermined pitch and constant amplitude, with a regular and repeating cadence. The predefined acoustic and prosodic information can be modified using the emotion markup from emotion translator 254 for adjusting the voice for emotion. Voice emotion adjuster 260 receives the modulated voice and the emotion markup from emotion translator 254 and, using the definitions in emotion-to-voice pattern dictionary 222, modifies the voice patterns in the modulated voice for emotion. The translated audio content of the message, with the emotion words for the culture, can then be played for the recipient with emotion voice patterns translated from the emotion content of the message for the culture.

Generating an audio message from a text message, including translation, is particularly useful in situations where the recipient does not have access to a visual display device or is unable to devote his attention to a visual record of the message. Furthermore, the recipient's device need not be equipped with emotion communication architecture 200 or emotion translation component 250. Instead, a server located between the sender and recipient may process the text message while preserving the content. For example, if the recipient is using a standard telephone without a video display, a server at the PSTN C.O., such as server 1042, between the recipient on one of telephones 1046, 1048 and 1049 may provide the communication processing while reserving emotion. Finally, although the above example is described for an instant message, the message may be, alternatively, an email or other type of textual message that includes emotion inferences, emoticons or the like.

In accordance with another exemplary embodiment of the present invention, text is derived from voice communication simultaneous with emotion, using two independent emotion analysis techniques, and the emotion of the voice communication is preserved using emotion markup metadata with the text. As briefly mentioned above, if the communication is not in a form which includes text and standardized emotion markup metadata, the communication is converted by emotion markup component 210 before emotion translation component 250 can process the communication. Emotion markup component 210 can be integrated in virtually any device or appliance that is configured with a microphone to receive an audio communication stream, including any of PCs 1012 or 1016, laptops 1018, 1026, 1047 or 1067, PDAs 1020 or 1058, cell phones 1056 or 1059, or telephones 1046, 1048, or 1049. Additionally, although servers do not typically receive first person audio communication via a microphone, they do receive audio communication in electronic form. Therefore, emotion markup component 210 may also be integrated in servers 1022, 1032, 1042, 1052 and 1062, although, pragmatically, emotion communication architecture 200 will be integrated on most servers which includes both emotion markup component 210 and emotion translation component 250.

Initially, before the voice communication can be processed, emotion-to-voice pattern dictionary 222 and emotion-to-phrase dictionary 220 within emotion markup component 210 are populated with definitions based on the qualities of the particular voice in the communication. Since a voice is as unique as its orator, the definitions used for analyzing both the textual content and emotional content of the communication are modified respective of the orator. One mechanism that is particularly useful for making these modifications is by storing profiles for any potential speakers in a profile database. The profiles include dictionary definitions and modifications associated with each speaker with respect to a particular audience and circumstance for a communication. The definitions and modifications are used to update a default dictionary for the particular characteristics of the individual speaker in the circumstance of the communication. Thus, emotion-to-voice pattern dictionary 222 and emotion-to-phrase dictionary 220 need only contain default definitions for the particular language of the potential speakers.

With emotion-to-voice pattern dictionary 222 and emotion-to-phrase dictionary 220 populated with the appropriate definitions for the speaker, audience and circumstance of the communication, the task of converting a voice communication to text with emotion markup while preserving emotion can proceed. For the purposes of describing the present invention, emotion communication architecture 200 is embedded within PC 1012. A user speaks into microphone 1014 of PC 1012 and emotion markup component 210 of emotion communication architecture 200 receives the voice communication (human speech), that includes emotion content (speech emotion). The audio communication stream is received at voice analyzer 232 which performs two independent functions: it analyzes the speech patterns for words (speech recognition); and also analyzes the speech patterns for emotion (emotion recognition), i.e., it recognizes words and it recognizes emotions from the audio communication. Words are derived from the voice communication using any automatic speech recognition (ASR) technique, such as using hidden Markov model (HMM). As words are recognized in the communication, they are passed to transcriber 234 and emotion markup engine 238. Transcriber 234 converts the words to text and then sends text instances to text/phrase analyzer 236. Emotion markup engine 238 buffers the text until it receives emotion corresponding to the text and then marks up the text with emotion metadata.

Emotion is derived from the voice communication by two types of emotional analysis on the audio communication stream. Voice analyzer 232 performs voice pattern analysis for deciphering emotion content from the speech patterns (the pitch, tone, cadence and amplitude characteristics of the speech). Near simultaneously, text/phrase analyzer 236 performs text pattern analysis (text mining) on the transcribed text received from transcriber 234 for deriving the emotion content from the textual content of the speech communication. With regard to the voice pattern analysis, voice analyzer 232 compares pitch, tone, cadence and amplitude voice patterns from the voice communication with voice patterns stored in emotion-to-voice pattern dictionary 222. The analysis may proceed using any voice pattern analysis technique, and when an emotion match is identified from the voice patterns, the emotion inference is passed to emotion markup engine 238. With regard to the text pattern analysis, text/phrase analyzer 236 text mines emotion-to-phrase dictionary 220 with text received from transcriber 234. When an emotion match is identified from the text patterns, the emotion inference is also passed to emotion markup engine 238. Emotion markup engine marks the text received from transcriber 234 with the emotion inferences from one or both of voice analyzer 232 and text/phrase analyzer 236.

In accordance with still another exemplary embodiment of the present invention, voice communication artifacts are archived as text with emotion markup metadata and searched using emotion and context. The search results are retrieved while preserving the emotion content of the original voice communication. Once the emotional content of a communication has been analyzed and emotion metadata created, the text stream may be sent directly to another device for modulating back into an audio communication and/or translating, or the communication may be archived for searching. Ordinarily, only text and the accompanying emotion metadata are archived as an artifact of communication's context and emotion, but the voice communication may also be archived. Notice in FIG. 10, that each of servers 1022, 1032, 1042, 1052 and 1062 are connected to memory databases 1024, 1034, 1044, 1054 and 1064, respectively. Each server may also have an embedded context with emotion search engine as described above with respect to FIG. 6, hence each perform content management functions. Voice communication artifacts in any of databases 1024, 1034, 1044, 1054 and 1064 may be retrieved by searching emotion in a particular communication context and then translated into another language without losing the emotion from the original voice communication.

For example, if a user on PC 1012 wishes to review examples of foreign language news reports where the reporter exhibits fear or apprehension during the report, the user accesses. The user submits a search request to a content management system, say server 1022, with the emotion term(s) fear and/or apprehension under the context of a news report. The context with emotion search engine embedded in server 1022 identifies all news report artifacts in database 1024 and searches the emotion metadata associated with those reports for fear or apprehension markup. The results of the search are returned to the user on PC 1012 and identify communications with the emotion. Relevant passages from the news reports that correspond to fear markup metadata are highlighted for inspection. The user selects one news report from the results that typifies a news report with fear or apprehension and the content management system of server 1022 retrieves the artifact and transmits it to PC 1012. It should be apparent that the content management system sends text with emotion markup and the user at PC 1012 can review the text and markup or synthesize it to voice with emotion adjustments, with or without translation. In this example, since the user is searching foreign language reports, a translation is expected. Furthermore, the user may merely review the translated search results in their text form without voice synthesizing the text or may choose to hear all of the results before selecting a report.

Using the present invention as described immediately above, a user could receive an abstraction of a voice communication, translate the textual and emotion content of the abstraction and hear the communication in the users language with emotion consistent with the user's culture. In one example, a speaker creates an audio message for a recipient who speaks a different language. The speech communication is received at PC 1012 with integrated emotion communication architecture 200. Using the dictionary definitions appropriate for the speaker, the voice communication is converted into text which preserves the emotion of the speech with emotion markup metadata and is transmitted to the recipient. The text with emotion markup is received at the recipients device, for instance at laptop 1026 with emotion communication architecture 200 integrated thereon. Using the dictionary definitions for the recipient's language and culture, the text and emotion are translated and emotion words included in the text that are consistent with the recipient's culture. The text is then voice synthesized and the synthesized delivery is adjusted for the emotion. Of course, the user of PC 1012 can designate which portions of text to adjust with the voice synthesized using the emotion metadata.

Alternatively, speaker's device and/or the recipient's device may not be configured with emotion communication architecture 200 or either of emotion markup component 210 or emotion translation component 250. In that case, the communication stream is processed remotely using a server with the embedded emotion communication architecture. For instance, a raw speech communication stream may be transmitted by telephones 1046, 1048 or 1049 which do not have the resident capacity to extract text and emotion from the voice. The voice communication is then processed by a network server with the onboard emotion communication architecture 200 or at least emotion markup component 210, such as server 1042 located at the PSTN C.O. (voice from PC 1016 may be converted to text with emotion markup at server 1022). In either case, the text with emotion markup is forwarded to laptop 1026. Conversely, text with emotion markup generated at laptop 1026 can be processed at a server. There, the text and emotion is translated, and emotion words included in the text that are consistent with the recipient's culture. The text can then be modulated into a voice and the synthesized voice adjusted for the emotion. The emotion adjusted synthesized voice is then sent to any of telephones 1046, 1048 or 1049 or PC 1016 as an audio message, as those devices do not have onboard text/emotion conversion and translation capabilities.

It should also be understood that emotion markup component 210 may be utilized for converting nonstandard emotion markup and emoticons to standardized emotion markup metadata that is recognizable by an emotion translation component. For instance, a text message, email or instant message is received at a device with embedded emotion markup component 210, such as PDA 1020 (alternatively the message may be generated on that device also). The communication is textual so no voice is available for processing, but the communication contains nonstandard emoticons. The text/phrase analyzer in emotion markup component 210 recognizes these textual characters and text mines them for emotion, which is passed to the markup engine as described above.

The aspects of the present invention described immediately above are particularly useful in cross platform communication between different communication channels, for instance between cell phone voice communication and PC textual communications, or between PC email communication and telephone voice mail communication. Moreover, because each communication is converted to text and preserves the emotion from the original voice communication as emotion markup metadata, the original communication can be efficiently translated into any other language with the emotion accurately represented for the culture of that language.

In accordance with another exemplary embodiment, some devices may be configured with either of emotion markup component 210 or emotion translation component 250, but not emotion communication architecture 200. For example, cell phone voice transmissions are notorious for their poor quality, which results is poor text recognition (and probably less accurate emotion recognition). Therefore, cell phones 1056 and 1059 are configured with emotion markup component 210 for processing the voice communication locally, while relying on server 1052 located at the cellular C.O. for processing incoming text with emotion markup using its embedded emotion communication architecture 200. Thus, the outgoing voice communication is efficiently processed while the cell phones 1056 and 1059 are not burdened with supporting the emotion translation component locally.

Similarly, over the air and cable monitors 1066, 1068 and 1069 do not have the capability to transmit voice communication and, therefore, do not need emotion markup capabilities. They do utilize text captioning for the hearing impaired, but without emotion cues. Therefore, configuring server 1062 at the media distribution center with the ability to markup text with emotion would aid in the enjoyment of the media received by the hearing impaired at monitors 1066, 1068 and 1069. Additionally, by embedding emotion translation component 250 at monitors 1066, 1068 and 1069 (or in the set top boxes), foreign language media could be translated to the native language while preserving the emotion from the original communication using the converted text with emotion markup from server 1062. A user on media network 1060, for instance on laptop 1067, will also be able to search database 1064 for entertainment media by emotion and order content based on that search, for example, by searching dramatic or comedic speeches or film monologues.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A computer program product for communicating across channels with emotion preservation, said computer program product comprising:

a computer usable storage medium having computer useable program code embodied therewith, the computer usable program code comprising:

computer usable program code to receive a first language communication comprising text marked up with emotion metadata;

computer usable program code to translate the emotion metadata into second language emotion metadata specific to a culture of said second language using a set of emotion-to-emotion definitions in an emotion dictionary;

computer usable program code to translate the text to second language text;

computer usable program code to analyze the second language emotion metadata for second language emotion information; and computer usable program code to combine the second language emotion information with the second language text.

2. The computer program product recited in claim 1, wherein the second language emotion information is one of text, phrase, punctuation, lexicon or syntax.

3. The computer program product recited in claim 2, further comprising:

computer program code to voice synthesize the second language text and the second language emotion text; and computer program code to adjust the synthesized voice with the second language emotion metadata.

4. The computer program produce recited in claim 2, wherein the computer program product to analyze the second language emotion metadata for second language emotion information further comprises:

computer program code to receive at least one second language emotion metadatum;

computer program code to access a plurality of voice emotion-to-text pattern definitions, said plurality of voice emotion-to-text pattern definitions being based on the second language; and computer program code to compare the at least one second language emotion metadatum to the plurality of voice emotion-to-text pattern definitions.

5. The computer program product recited in claim 4, further comprising: computer program code to select the plurality of voice emotion-to-text pattern definitions are based on the second language.

6. The computer program product recited in claim 1, further comprising computer usable program code to translate the emotion metadata into second language emotion metadata using a user profile.

7. The computer program product recited in claim 6, wherein the user profile is a profile of a person originating the first language communication.

8. The computer program product recited in claim 6, wherein the user profile is a profile of a user receiving a communication in the second language, wherein the communication in the second language comprises the second language text.

9. The computer program product recited in claim 8, wherein the communication in the second language comprises a synthesized voice speaking the second language text, the synthesized voice being adjusted using the second language emotion metadata.

10. The computer program product recited in claim 1, wherein the second language information comprises emoticons, and the computer usable program code to combine the second language emotion information with the second language text outputs the second language text in written form including said emoticons.

11. A computer program product for communicating across channels with emotion preservation, said computer program product comprising:

a computer usable storage medium having computer useable program code embodied therewith, the computer usable program code comprising:

computer usable program code to receive a first language communication comprising text marked up with emotion metadata;

computer usable program code to translate the emotion metadata into second language emotion metadata;

computer usable pro ram code to translate the text to second language text;

computer usable program code to combine the second language emotion metadata with the second language text;

computer program code to output a synthesized voice speaking the second language text, with computer program code to adjust the synthesized voice with the second language emotion metadata;

wherein the computer program product to adjust the synthesized voice with the second language emotion metadata further comprises:

computer program code to receive at least one second language emotion metadatum;

computer program code to access a plurality of emotion-to-voice pattern definitions, wherein the voice patterns comprises one of pitch, tone, cadence and amplitude;

computer program code to match the at least one second language emotion metadatum to one of the plurality of emotion-to-voice pattern definitions, said plurality of emotion-to-voice pattern definitions being based on the second language; and computer program code to alter a synthesized voice pattern of the synthesized voice with a voice pattern corresponding to the matching emotion-to-voice pattern definition.

12. A computer program product for communicating electronically with emotion preservation, said computer program product comprising:

a computer usable storage medium having computer useable program code embodied therewith, the computer usable program code comprising:

computer usable program code to receive a first language communication comprising text marked up with emotion metadata;

computer usable program code to translate the emotion metadata into second language emotion metadata based on a user profile;

computer usable program code to translate the text to second language text; and computer usable program code to associate the second language text with the second language emotion metadata.

13. The computer program product of claim 12, wherein the user profile is a profile of a person originating the first language communication.

14. The computer program product of claim 13, wherein emotion-to-text/phrase definitions for use in translating the emotion metadata into the second language emotion metadata are selected and used according to the profile of the person originating the first language communication.

15. The computer program product of claim 12, wherein the user profile is of a user receiving a communication in the second language that is based on the first language communication.

16. The computer program product of claim 15, wherein emotion-to-text/phrase definitions for use in translating the emotion metadata into the second language emotion metadata are selected and used according to the profile of the user receiving the communication in the second language.

17. The computer program product of claim 12, further comprising computer usable program code to translate the emotion metadata into second language emotion metadata based on a context profile.

18. The computer program product of claim 12, further comprising computer usable program code to output a communication in the second language using the second language text associated with the second language emotion metadata.

19. The computer program product of claim 18, wherein the communication in the second language comprises a synthesized voice speaking the second language text, the synthesized voice being adjusted using the second language emotion metadata.

20. The computer program product recited in claim 12, wherein the second language metadata comprises emoticons and the computer usable program code to associate the second language text with the second language emotion metadata outputs the second language text in written form including said emoticons.

* * * * *